(12) United States Patent
Fang et al.

(10) Patent No.: US 12,003,710 B2
(45) Date of Patent: Jun. 4, 2024

(54) SYSTEMS AND METHODS FOR INTRA PREDICTION

(71) Applicant: ZHEJIANG DAHUA TECHNOLOGY CO., LTD., Zhejiang (CN)

(72) Inventors: Cheng Fang, Hangzhou (CN); Dong Jiang, Hangzhou (CN); Jucai Lin, Hangzhou (CN); Jun Yin, Hangzhou (CN); Feiyang Zeng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 330 days.

(21) Appl. No.: 17/447,200

(22) Filed: Sep. 9, 2021

(65) Prior Publication Data

US 2021/0409700 A1    Dec. 30, 2021

Related U.S. Application Data

(63) Continuation of application No. PCT/CN2020/076377, filed on Feb. 24, 2020.

(30) Foreign Application Priority Data

Mar. 12, 2019   (CN) .......................... 201910185833.2

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/159* (2014.11); *H04N 19/176* (2014.11); *H04N 19/593* (2014.11)

(58) Field of Classification Search
CPC .. H04N 19/176; H04N 19/105; H04N 19/159; H04N 19/593; H04N 19/11;
(Continued)

(56) References Cited

U.S. PATENT DOCUMENTS

2012/0320974 A1   12/2012 Li et al.
2017/0150180 A1   5/2017 Lin et al.
(Continued)

FOREIGN PATENT DOCUMENTS

| CN | 108881907 A | 11/2018 | |
|---|---|---|---|
| EP | 3879826 B1 * | 8/2022 | ........... H04N 19/105 |
| WO | 2020181979 A1 | 9/2020 | |

OTHER PUBLICATIONS

International Search Report in PCT/CN2020/076377 dated May 14, 2020, 4 pages.
(Continued)

*Primary Examiner* — Masum Billah
(74) *Attorney, Agent, or Firm* — METIS IP LLC

(57) ABSTRACT

The present disclosure relates to systems and methods for intra prediction. The methods may include selecting a candidate prediction block from a plurality of prediction blocks of a video slice according to a first condition, wherein a width of the candidate prediction block is different from a height of the candidate prediction block; selecting an angular prediction mode from a plurality of candidate prediction modes of the candidate prediction block; and determining a filter for the angular prediction mode of the candidate prediction block according to a second condition.

19 Claims, 11 Drawing Sheets

(51) Int. Cl.
*H04N 19/159* (2014.01)
*H04N 19/176* (2014.01)
*H04N 19/593* (2014.01)

(58) Field of Classification Search
CPC ........ H04N 19/96; H04N 19/70; H04N 19/44; H04N 19/182; H04N 19/51
USPC ......................................................... 375/240
See application file for complete search history.

(56) References Cited

U.S. PATENT DOCUMENTS

| | | | |
|---|---|---|---|
| 2017/0155925 A1 | 6/2017 | Li et al. | |
| 2017/0353730 A1 | 12/2017 | Liu et al. | |
| 2019/0037231 A1* | 1/2019 | Ikai | H04N 19/52 |
| 2019/0208209 A1 | 7/2019 | Jang et al. | |
| 2020/0099925 A1* | 3/2020 | Lee | H04N 19/82 |
| 2020/0099935 A1* | 3/2020 | Lee | H04N 19/196 |
| 2020/0137404 A1 | 4/2020 | Yoo et al. | |
| 2020/0204799 A1* | 6/2020 | Lee | H04N 19/11 |
| 2020/0275124 A1* | 8/2020 | Ko | H04N 19/176 |
| 2020/0329236 A1 | 10/2020 | Yoo et al. | |

OTHER PUBLICATIONS

Written Opinion in PCT/CN2020/076377 dated May 14, 2020, 6 pages.
First Office Action in Chinese Application No. 201910185833.2 dated Dec. 30, 2020, 16 pages.
Mathias Wien, Variable Block-Size Transforms for H.264/AVC, IEEE Transactions on Circuits and Systems for Video Technology, 13(7): 604-613, 2003.
Mahsa T. Pourazad et al., HEVC: The New Gold Standard for Video Compression, IEEE Consumer Electronics Magazine, 36-46, 2012.
Telecommunication Standardization Sector of ITU, ITU-T H.264, 2013.
The Extended European Search Report in European Application No. 20769326.8 dated Jul. 8, 2022, 7 pages.

* cited by examiner

SYSTEMS AND METHODS FOR INTRA PREDICTION

CROSS-REFERENCE TO RELATED APPLICATIONS

This application is a Continuation of International Application No. PCT/CN2020/076377, filed on Feb. 24, 2020, which claims priority of Chinese Application No. 201910185833.2, filed on Mar. 12, 2019, the contents of which are incorporated herein by reference.

TECHNICAL FIELD

The present disclosure generally relates to systems and methods for image processing, and more particularly, to systems and methods for intra prediction.

BACKGROUND

Videos are usually encoded and compressed before transmission or storage. However, due to hardware and other constraints, such as limited storage space and limited transmission bandwidths, a compressed size of a video is preferred to be as small as possible. Existing methods for determining whether to filter reference pixels in intra prediction are usually based on a value of log 2Size (log 2Size=(Log 2width+Log 2height])>>1, wherein width denotes to a width of a current prediction block, and height denotes to a height of the current prediction block) and a prediction mode. The value of log 2Size cannot entirely reflect size characteristics of a prediction block that is not a square. For example, the values of log 2Size of three different sizes of block predictions, such as 8*8, 8*16, and 16*8 are the same. Therefore, using the value of log 2Size to determine whether to filter reference pixels in intra prediction cannot match different sizes, and results in bad filtering effects. Thus, it is desirable to provide systems and methods for intra prediction, especially for determining whether to filter reference pixels and determining a filter for filtering the reference pixels, to improve filtering effects.

SUMMARY

An aspect of the present disclosure introduces a system for intra prediction. The system may include at least one storage medium including a set of instructions for intra prediction, and at least one processor in communication with the storage medium. When executing the set of instructions, the at least one processor may perform the operations including: selecting a candidate prediction block from a plurality of prediction blocks of a video slice according to a first condition, wherein a width of the candidate prediction block is different from a height of the candidate prediction block; selecting an angular prediction mode from a plurality of candidate prediction modes of the candidate prediction block; and determining a filter for the angular prediction mode of the candidate prediction block according to a second condition.

In some embodiments, the first condition includes a first aspect ratio condition associated with a ratio of a width of a prediction block to a height of the prediction block.

In some embodiments, the first condition includes a first side length condition associated with a maximum value or a minimum value between a width of a prediction block and a height of the prediction block.

In some embodiments, the first condition includes a distance condition associated with a diagonal distance of a prediction block.

In some embodiments, the first condition is associated with a ratio of a width of a prediction block to a height of the prediction block, and at least one of: a logarithmic function of the width of the prediction block and the height of the prediction block; a maximum value between the width of the prediction block and the height of the prediction block; or a minimum value between the width of the prediction block and the height of the prediction block.

In some embodiments, the first condition includes at least one of:

a0: unconditional;
a1: $m1 \geq \log 2size \geq m0$, and $n1 \geq w/d \geq n0$ or $1/n1 \leq w/d \leq 1/n0$;
a2: $m1 \geq \log 2size \geq m0$, and $w/d$ satisfies one of $w/d \geq n1$, $w/d \leq n0$, $w/d \leq 1/n1$, or $w/d \geq 1/n0$;
a3: $n1 \geq w/d \geq n0$ or $1/n1 \leq w/d \leq 1/n0$, and $\log 2size$ satisfies one of $\log 2size \geq m1$, or $\log 2size \leq m0$;
a4: $\log 2size$ satisfies one of $\log 2size \geq m1$, or $\log 2size \leq m0$, and $w/d$ satisfies one of $w/d \geq n1$, $w/d \leq n0$, $w/d \leq 1/n1$, or $w/d \geq 1/n0$;
a5: $L1 \geq length0 \geq L0$, and $n1 \geq w/d \geq n0$ or $1/n1 \leq w/d \leq 1/n0$;
a6: $L1 \geq length0 \geq L0$, and $w/d$ satisfies one of $w/d \geq n1$, $w/d \leq n0$, $w/d \leq 1/n1$, or $w/d \geq 1/n0$;
a7: $n1 \geq w/d \geq n0$ or $1/n1 \leq w/d \leq 1/n0$, and $length0$ satisfies one of $length0 \geq L1$, or $length0 \leq L0$;
a8: $length0$ satisfies one of $length0 \geq L1$, or $length0 \leq L0$, and $w/d$ satisfies one of $w/d \geq n1$, $w/d \leq n0$, $w/d \leq 1/n1$, or $w/d \geq 1/n0$;
a9: $L1 \geq length1 \geq L0$, and $n1 \geq w/d \geq n0$ or $1/n1 \leq w/d \leq 1/n0$;
a10: $L1 \geq length1 \geq L0$, and $w/d$ satisfies one of $w/d \geq n1$, $w/d \leq n0$, $w/d \leq 1/n1$, or $w/d \geq 1/n0$;
a11: $n1 \geq w/d \geq n0$ or $1/n1 \leq w/d \leq 1/n0$, and $length1$ satisfies one of $length1 \geq L1$, or $length1 \leq L0$; or
a12: $length1$ satisfies one of $length1 \geq L1$, or $length1 \leq L0$, and $w/d$ satisfies one of $w/d \geq n1$, $w/d \leq n0$, $w/d \leq 1/n1$, or $w/d \geq 1/n0$;

wherein
  log 2size is the logarithmic function of the width of the prediction block and the height of the prediction block,
  w/d is the ratio of the width of the prediction block to the height of the prediction block,
  length0 is the maximum value between the width of the prediction block and the height of the prediction block,
  length1 is the minimum value between the width of the prediction block and the height of the prediction block, and
  L0, L1, m1, m0, n1, and n0 are predetermined values.

In some embodiments, the second condition includes a width condition associated with the width of the candidate prediction block.

In some embodiments, the second condition includes a height condition associated with the height of the candidate prediction block.

In some embodiments, the second condition includes a position condition associated with a position or a direction that the angular prediction mode is directed to.

In some embodiments, the second condition includes a second side length condition associated with a maximum value or a minimum value between the width of the candidate prediction block and the height of the candidate prediction block.

In some embodiments, the second condition includes a second aspect ratio condition associated with a ratio of the width of the candidate prediction block to the height of the candidate prediction block.

In some embodiments, the second condition includes at least one of:

b0:
designating a logarithmic function of the width of the candidate prediction block as a first size parameter, and determining the filter for filtering reference pixels of the candidate prediction block along a width direction of the candidate prediction block based on the first size parameter and a predetermined rule;
designating a logarithmic function of the height of the candidate prediction block as a second size parameter, and determining the filter for filtering reference pixels of the candidate prediction block along a height direction of the candidate prediction block based on the second size parameter and the predetermined rule;

b1:
in response to a determination that the angular prediction mode is directed to a predetermined area, determining the filter as a first type of filter;
in response to a determination that the angular prediction mode is not directed to the predetermined area, determining the filter for filtering reference pixels of the candidate prediction block along the width direction of the candidate prediction block based on the first size parameter and the predetermined rule, and the filter for filtering reference pixels of the candidate prediction block along the height direction of the candidate prediction block based on the second size parameter and the predetermined rule, respectively;

b2:
designating a logarithmic function of a maximum value between the width of the candidate prediction block and the height of the candidate prediction block as a third size parameter, and determining the filter for filtering reference pixels of the candidate prediction block based on the third size parameter and the predetermined rule;

b3:
in response to a determination that w/d≥r or w/d≤1/r, designating a logarithmic function of a minimum value between the width of the candidate prediction block and the height of the candidate prediction block as a fourth size parameter, and determining the filter for filtering reference pixels of the candidate prediction block based on the fourth size parameter and the predetermined rule;
in response to a determination that w/d<r or w/d>1/r, determining the filter for filtering reference pixels of the candidate prediction block based on the third size parameter and the predetermined rule; or b4:
designating a logarithmic function of the width of the candidate prediction block and the height of the candidate prediction block as a fifth size parameter, and determining the filter for filtering reference pixels of the candidate prediction block based on the fifth size parameter and the predetermined rule.

In some embodiments, the predetermined rule includes:
in response to a determination that a size parameter of the first size parameter, the second size parameter, the third size parameter, the fourth size parameter, and the fifth size parameter is in a first range, determining the filter as the first type of filter;
in response to a determination that a size parameter of the first size parameter, the second size parameter, the third size parameter, the fourth size parameter, and the fifth size parameter is beyond the first range, and the angular prediction mode is in a second predetermined filtering range, determining the filter as a second type of filter; and
in response to a determination that a size parameter of the first size parameter, the second size parameter, the third size parameter, the fourth size parameter, and the fifth size parameter is beyond the first range and the angular prediction mode is beyond the second predetermined filtering range, determining the filter as the first type of filter.

In some embodiments, the predetermined area includes at least one of a first vertical diagonal area, a first horizontal diagonal area, a second vertical diagonal area, a second horizontal diagonal area, a near-vertical area, or a near-horizontal area.

In some embodiments, the first vertical diagonal area corresponds to prediction modes 34, 35, 65, and 66;
the first horizontal diagonal area corresponds to prediction modes 2, 3, 33, and 34;
in response to a determination that the width of the candidate prediction block is 16, the near-vertical area corresponds to prediction modes 42-47, and 53-58, and the second vertical diagonal area corresponds to prediction modes 36-41, and 59-64;
in response to a determination that the width of the candidate prediction block is 32, the near-vertical area corresponds to prediction modes 43-49, and 51-57, and the second vertical diagonal area corresponds to prediction modes 36-42, and 58-64;
in response to a determination that the width of the candidate prediction block is 8 or 4, the near-vertical area corresponds to no prediction mode, and the second vertical diagonal area corresponds to no prediction mode;
in response to a determination that the height of the candidate prediction block is 16, the near-horizontal area corresponds to prediction modes 9-15, and 21-26, and the second horizontal diagonal area corresponds to prediction modes 4-8, and 27-32;
in response to a determination that the height of the candidate prediction block is 32, the near-horizontal area corresponds to prediction modes 11-17, and 19-25, and the second horizontal diagonal area corresponds to prediction modes 4-10, and 26-32; and
in response to a determination that the height of the candidate prediction block is 8 or 4, the near-horizontal area corresponds to no prediction mode, and the second horizontal diagonal area corresponds to no prediction mode.

In some embodiments, the first range corresponds to size parameters 2 and 6;
in response to a determination that the size parameter equals to 3, the second predetermined filtering range corresponds to prediction modes 2, 3, 33, 34, 35, 65, and 66;
in response to a determination that the size parameter equals to 4, the second predetermined filtering range corresponds to prediction modes 2-15, 21-47, and 53-66; and
in response to a determination that the size parameter equals to 5, the second predetermined filtering range corresponds to prediction modes 2-17, 19-49, and 51-66.

In some embodiments, the filter includes a set of first type of filters, a first tap count T of taps of the filter is no less than 4, each first type of filter corresponds to a set of first coefficients, a first filter count I of the set of first type of filters is no less than 8, and each set of first coefficients f[t] includes T coefficients corresponding to T reference pixels of the candidate prediction block, in which t is an integer in a range from 0 to (I−1), and wherein in response to a determination that T is an odd integer,
the T reference pixels includes a current reference pixel and (T−1)/2 reference pixels on each side of the current reference pixel, $f[t] = \{a_{t,0}, \ldots, a_{t,(T-1)/2}, \ldots, a_{t,(T-1)}\}$, coefficients $a_{t,0}$, $a_{t,1}$, ... $a_{t,(T-1)/2}$ decreases successively,
a difference between two adjacent coefficients of $a_{t,0}$, $a_{t,1}$, ..., $a_{t,\frac{T-1}{2}-1}$ increases successively,
coefficients $a_{t,\frac{T-1}{2}+1}, a_{t,\frac{T-1}{2}+2},$ ... $a_{t,(T-1)}$ increases successively,
a difference between two adjacent coefficients of $a_{t,(T-1)/2+1}, a_{t,(T-1)/2+2}, \ldots, a_{t,(T-1)}$ decreases successively, and
a sum of the coefficients $a_{t,0}, \ldots, a_{t,(T-1)/2}, \ldots, a_{t,(T-1)}$ equals to $a_{0,(T-1)/2}$;

in response to a determination that T is an even integer,
the T reference pixels includes a current reference pixel, (T/2−1) reference pixels in a coding direction, and T/2 reference pixels in a reverse coding direction, $f[t] = \{a_{t,0}, \ldots, a_{t,(T/2-1)}, \ldots, a_{t,(T-1)}\}$, coefficients $a_{t,0}, a_{t,1}, \ldots, a_{t,(T/2-2)}$ decreases successively,
a difference between two adjacent coefficients of $a_{t,0}, a_{t,1}, \ldots, a_{t,(T/2-2)}$ increases successively,
coefficients $a_{t,(T/2+1)}, a_{t,(T/2+2)}, \ldots, a_{t,(T-1)}$ increases successively,
a difference between two adjacent coefficients of $a_{t,(T/2+1)}, a_{t,(T/2+2)}, \ldots, a_{t,(T-1)}$ decreases successively, and
a sum of the coefficients $a_{t,0}, \ldots, a_{t,(T/2-1)}, \ldots, a_{t,(T-1)}$ equals to $a_{0,(T/2-1)}$.

In some embodiments, the filter includes a set of second type of filters, a second tap count T of taps of the filter is no less than 3, each second type of filter corresponds to a set of second coefficients, a second filter count I of the set of second type of filters is no less than 8, and each set of second coefficients f[t] includes T coefficients corresponding to T reference pixels of the candidate prediction block, in which t is an integer in a range from 0 to (I-1), and wherein in response to a determination that T is an odd integer,
the T reference pixels includes a current reference pixel and (T−1)/2 reference pixels on each side of the current reference pixel, $f[t] = \{a_{t,0}, \ldots, a_{t,(T-1)/2}, \ldots, a_{t,(T-1)}\}$, coefficients $a_{t,0}, a_{t,1}, \ldots,$ $\frac{T-1}{2} - 1$ increases successively,
a difference between two adjacent coefficients of $a_{t,0}, a_{t,1}, \ldots,$ $a_{t,\frac{T-1}{2}-1}$ increases successively,
coefficients $a_{t,\frac{T-1}{2}+1}, a_{t,\frac{T-1}{2}+2},$ ... $a_{t,(T-1)}$ decreases successively,
a difference between two adjacent coefficients of $a_{t,(T-1)/2+1}, a_{t,(T-1)/2+2}, \ldots, a_{t,(T-1)}$ decreases successively, and
a sum of the coefficients $a_{t,0}, \ldots, a_{t,(T-1)/2}, \ldots, a_{t,(T-1)}$ equals to $2a_{t,(T-1)/2}$;

in response to a determination that T is an even integer,
the T reference pixels includes a current reference pixel, (T/2−1) reference pixels in a coding direction, and T/2 reference pixels in a reverse coding direction, $f[t] = \{a_{t,0}, \ldots, a_{t,(T/2-1)}, \ldots, a_{t,(T-1)}\}$, coefficients $a_{t,0}, a_{t,1}, \ldots, a_{t,(T/2-2)}$ increases successively,
a difference between two adjacent coefficients of $a_{t,0}, a_{t,1}, \ldots, a_{t,(T/2-2)}$ increases successively,
coefficients $a_{t,(T/2)}, a_{t,(T/2+1)}, \ldots, a_{t,(T-1)}$ decreases successively,
a difference between two adjacent coefficients of $a_{t,(T/2)}, a_{t,(T/2+1)}, \ldots, a_{t,(T-1)}$ decreases successively, and
a sum of the coefficients $a_{t,0}, \ldots, a_{t,(T/2-1)}, \ldots, a_{t,(T-1)}$ equals to $2a_{0,T/2-1}$.

In some embodiments, the determining the filter includes: determining a tap count of taps of the filter; and determining coefficients of the filter based on the tap count.

In some embodiments, the at least one processor is directed to perform additional operations including: obtaining reference pixels of the candidate prediction block based on the angular prediction mode; filtering the reference pixels using the filter; and determining, based on the filtered reference pixels, a predicted pixel value of each candidate pixel in the candidate prediction block.

According to another aspect of the present disclosure, a method for intra prediction is provided. The method may include selecting a candidate prediction block from a plurality of prediction blocks of a video slice according to a first condition, wherein a width of the candidate prediction block is different from a height of the candidate prediction block; selecting an angular prediction mode from a plurality of candidate prediction modes of the candidate prediction block; and determining a filter for the angular prediction mode of the candidate prediction block according to a second condition.

According to still another aspect of the present disclosure, a non-transitory computer-readable medium, comprising at least one set of instructions compatible for intra prediction is provided. When executed by at least one processor of an electrical device, the at least one set of instructions may direct the at least one processor to perform the following operations. The at least one processor may perform the operations including: selecting a candidate prediction block from a plurality of prediction blocks of a video slice according to a first condition, wherein a width of the candidate prediction block is different from a height of the candidate prediction block; selecting an angular prediction mode from a plurality of candidate prediction modes of the candidate prediction block; and determining a filter for the angular prediction mode of the candidate prediction block according to a second condition.

According to another aspect of the present disclosure, a system for intra prediction is provided. The system may include at least one storage medium including a set of instructions for intra prediction, and at least one processor in communication with the storage medium. When executing the set of instructions, the at least one processor may perform the operations including: obtaining a candidate prediction block to be predicted, wherein a width of the candidate prediction block is different from a height of the candidate prediction block; determining reference pixels of the candidate prediction block; determining, based on a size of the candidate prediction block and a current prediction mode, a filter for filtering the reference pixels of the candidate prediction block; and determining, in the current prediction mode, a predicted pixel value of each candidate pixel in the candidate prediction block, based on the reference pixels and the filter.

According to another aspect of the present disclosure, a method for intra prediction is provided. The method may include obtaining a candidate prediction block to be predicted, wherein a width of the candidate prediction block is different from a height of the candidate prediction block; determining reference pixels of the candidate prediction block; determining, based on a size of the candidate prediction block and a current prediction mode, a filter for filtering the reference pixels of the candidate prediction block; and determining, in the current prediction mode, a predicted pixel value of each candidate pixel in the candidate prediction block, based on the reference pixels and the filter.

According to still another aspect of the present disclosure, a non-transitory computer-readable medium, comprising at least one set of instructions compatible for intra prediction is provided. When executed by at least one processor of an electrical device, the at least one set of instructions may direct the at least one processor to perform the following operations. The at least one processor may perform the operations including: obtaining a candidate prediction block to be predicted, wherein a width of the candidate prediction block is different from a height of the candidate prediction block; determining reference pixels of the candidate prediction block; determining, based on a size of the candidate prediction block and a current prediction mode, a filter for filtering the reference pixels of the candidate prediction block; and determining, in the current prediction mode, a predicted pixel value of each candidate pixel in the candidate prediction block, based on the reference pixels and the filter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
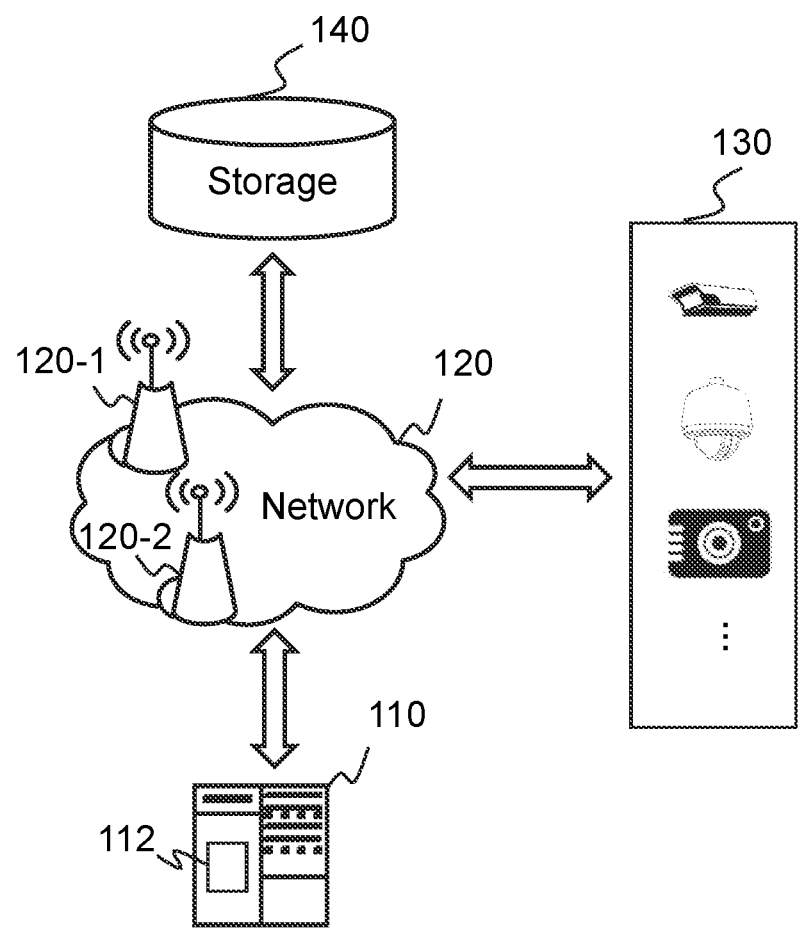
FIG. 1 is a schematic diagram illustrating an exemplary system for intra prediction according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise.

It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for intra prediction, especially for determining a filter for an angular prediction mode of a prediction block that is not a square. To this end, the systems and methods may select a prediction block of a video slice according to a first condition associated with a ratio of a width of a prediction block to a height of the prediction block, and at least one of: a logarithmic function of the width of the prediction block and the height of the prediction block; a maximum value between the width of the prediction block and the height of the prediction block; or a minimum value between the width of the prediction block and the height of the prediction block. The systems and methods may further select an angular prediction mode of the prediction block, and determine a filter for the angular prediction mode of the prediction block according to a second condition. The second condition may include a width condition associated with the width of the prediction block, a height condition associated with the height of the prediction block, a position condition associated with a position or a direction that the angular prediction mode is directed to, a side length condition associated with a maximum value or a minimum value between the width of the prediction block and the height of the prediction block, an aspect ratio condition associated with a ratio of the width of the prediction block to the height of the prediction block, or the like, or any combination thereof. The systems and methods may design the filter for filtering reference pixels determined according to the angular prediction mode.

FIG. 1 is a schematic diagram of an exemplary system 100 for intra prediction according to some embodiments of the present disclosure. The system 100 may include a server 110, a network 120, a camera 130, and a storage 140.

The server 110 may be configured to process information and/or data relating to intra prediction. For example, the server 110 may determine a filter for filtering reference pixels of a candidate prediction block based on a size of the candidate prediction block and a current prediction mode. As another example, the server 110 may determine a predicted pixel value of each candidate pixel in the candidate prediction block based on the reference pixels and the filter in the current prediction mode. In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the camera 130, and/or the storage 140 via the network 120. As another example, the server 110 may connect the camera 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure. In some embodiments, the server 110 may be an encoder.

In some embodiments, the server 110 may include a processing engine 112. The processing engine 112 may process information and/or data relating to intra prediction. For example, the processing engine 112 may determine a filter for filtering reference pixels of a candidate prediction block based on a size of the candidate prediction block and a current prediction mode. As another example, the processing engine 112 may determine a predicted pixel value of each candidate pixel in the candidate prediction block based on the reference pixels and the filter in the current prediction mode. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

The network 120 may facilitate the exchange of information and/or data. In some embodiments, one or more components of the system 100 (e.g., the server 110, the camera 130, and the storage 140) may transmit information and/or data to other component(s) in the system 100 via the network 120. For example, the server 110 may obtain a video from the camera 130 via the network 120. As another example, the server 110 may obtain a plurality of prediction blocks of a video slice from the storage 140 via the network 120. As still another example, the server 110 may obtain a plurality of candidate prediction modes of a candidate prediction block from the storage 140 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . ., through which one or more components of the system 100 may be connected to the network 120 to exchange data and/or information between them.

The camera 130 may be any electronic device that is capable of capturing images or videos. For example, the camera 130 may include an image sensor, a video recorder, or the like, or any combination thereof. In some embodiments, the camera 130 may include any suitable types of camera, such as a fixed camera, a fixed dome camera, a covert camera, a Pan-Tilt-Zoom (PTZ) camera, a thermal camera, or the like, or any combination thereof. In some embodiments, the camera 130 may further include at least one network port. The at least one network port may be configured to send information to and/or receive information from one or more components in the system 100 (e.g., the server 110, the storage 140) via the network 120. In some embodiments, the camera 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the camera 130 (e.g., video or images). As another example, the storage 140 may store the plurality of prediction blocks of the video slice. As another example, the storage 140 may store the plurality of candidate prediction modes of the candidate prediction block. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the camera 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the camera 130). In some embodiments, the storage 140 may be part of the server 110.

Figure 2:
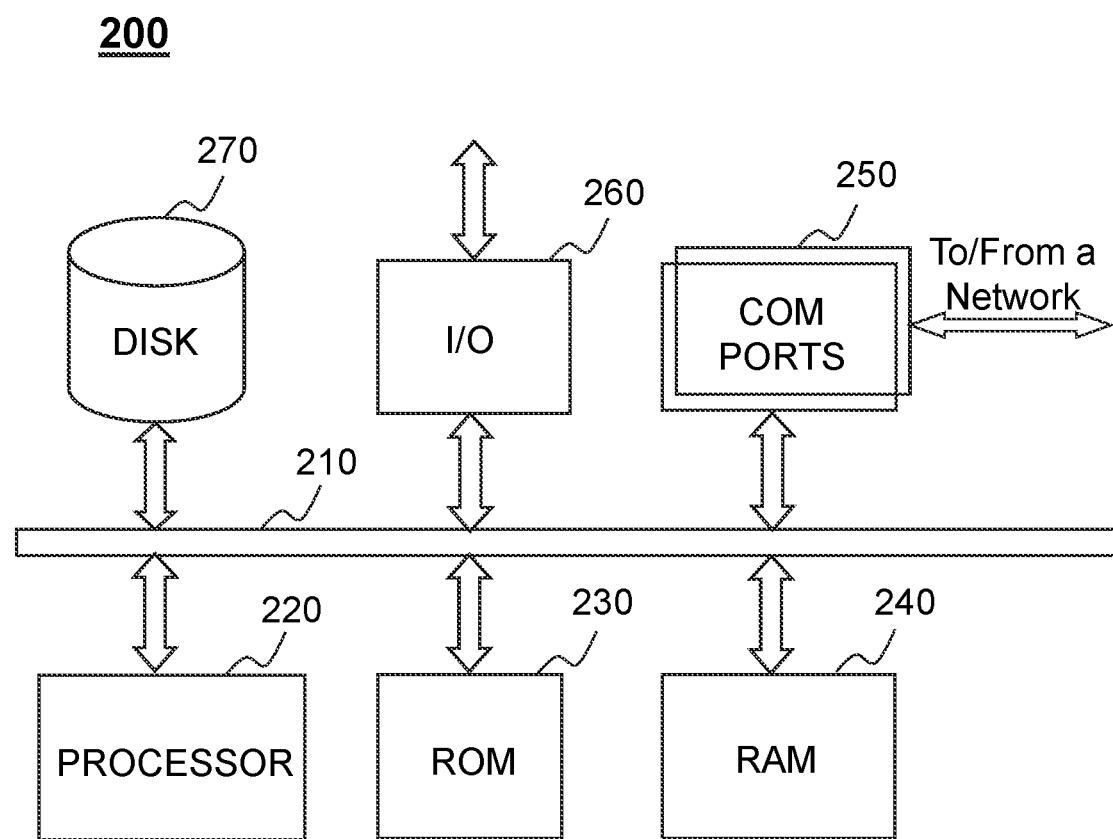
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the camera 130 may be implemented according to some embodiments of the present disclosure. For example, the processing engine 112 or an encoder may be implemented on the computing device 200 and configured to perform functions of the processing engine 112 disclosed in this disclosure.

The computing device 200 may be used to implement a system 100 for the present disclosure. The computing device 200 may be used to implement any component of system 100 that performs one or more functions disclosed in the present disclosure. For example, the processing engine 112 may be implemented on the computing device 200, via its hardware, software program, firmware, or a combination thereof. Although only one such computer is shown, for convenience, the computer functions relating to the intra prediction as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the camera 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a filter, a predicted pixel value of each candidate pixel) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The exemplary computing device may also include operating systems stored in the ROM 230, RAM 240, and/or other types of non-transitory storage medium to be executed by the processor 220. The program instructions may be compatible with the operating systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
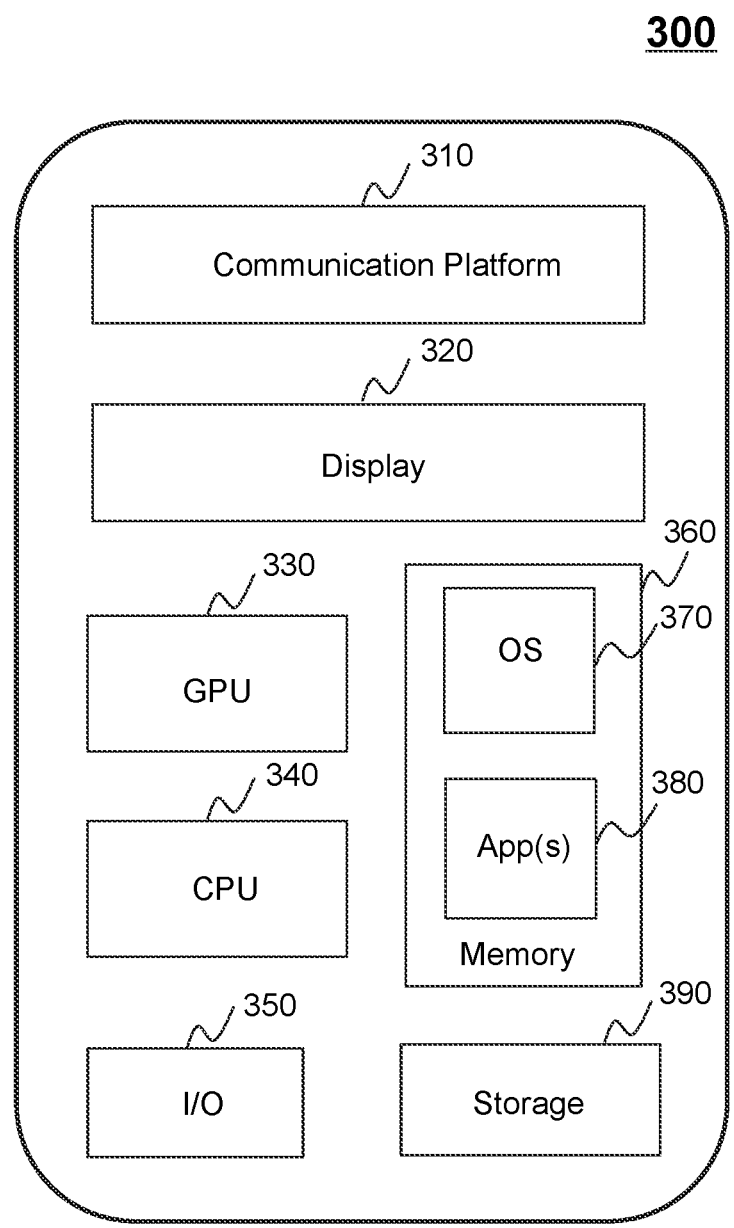
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the camera 130 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-11). The hardware elements, operating systems and programming languages of such computers are conventional in nature, and it is presumed that those skilled in the art are adequately familiar therewith to adapt those technologies to select the best facial image of the target human face as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
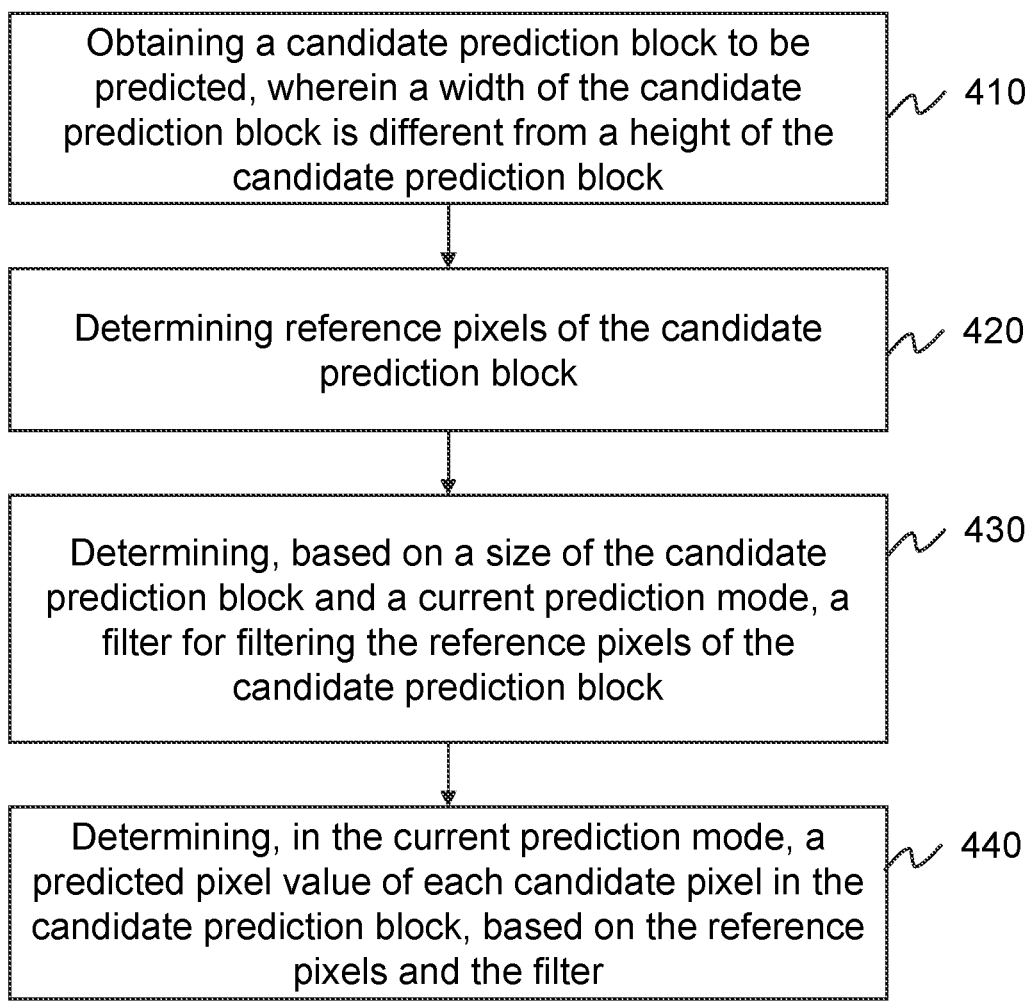
FIG. 4 is a flowchart illustrating an exemplary process for intra prediction according to some embodiments of the present disclosure.

FIG. 4 is a flowchart illustrating an exemplary process 400 for intra prediction according to some embodiments of the present disclosure. The process 400 may be executed by the system 100. For example, the process 400 may be implemented as a set of instructions (e.g., an application) stored in the storage ROM 230 or the RAM 240. The processor 220 may execute the set of instructions, and when executing the instructions, it may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 410, the processing engine 112 (e.g., the processor 220) may obtain a candidate prediction block to be predicted.

In some embodiments, the candidate prediction block may be a coding unit (CU) in the intra prediction that needs to be predicted. In some embodiments, the candidate prediction block may include a plurality of pixels. In some embodiments, the candidate prediction block may be a luma prediction block or a luma coding unit. In some embodiments, a width of the candidate prediction block may be different from a height of the candidate prediction block.

In 420, the processing engine 112 (e.g., the processor 220) may determine reference pixels of the candidate prediction block.

In some embodiments, the reference pixels may be used for predicting a pixel value of each pixel in the candidate prediction block. In some embodiments, the processing engine 112 may define at least two reference lines on at least two sides of the candidate prediction block. In some embodiments, along a coding direction of the candidate prediction block, there may be at least one reference line. In some embodiments, the coding direction may be a direction along to a coding order, and a reverse coding direction may be a direction opposite to the coding order. For example, if the coding order is from left to right and from top to bottom, the at least two reference lines may be on the left side and/or top side of the candidate prediction block.

In some embodiments, a pixel value of each reference pixel on the at least two reference lines may be predetermined before performing the operation 410. For example, the pixel value of each reference pixel may be determined according to pixel values that have completed encoded. For a reference line in the coding direction, the pixel value of a reference pixel on the reference line may be determined in turn according to the coding direction (for example, from bottom to top, from left to right). If the pixel value of a reference pixel is not available, that is, the reference pixel has not completed encoding, and the reference pixel is not an initial reference pixel. The pixel value of the reference pixel may be designated as the pixel value of a previous reference pixel along the coding direction. If the previous reference pixel is not available, a pixel value of a first available reference pixel along the coding direction may be designated as the pixel value of each pixel from the initial reference pixel to the first available reference pixel.

In 430, the processing engine 112 (e.g., the processor 220) may determine, based on a size of the candidate prediction block and a current prediction mode, a filter for filtering the reference pixels of the candidate prediction block.

In some embodiments, the size of the candidate prediction block may reflect a shape or an area of the candidate prediction mode. For example, the size of the candidate prediction block may include a width, a height, a diagonal line of the candidate prediction block, or the like, or any combination thereof.

In some embodiments, the current prediction mode may include a planar mode, a direct current (DC) mode, an angular prediction mode, or the like, or any combination thereof. In some embodiments, the planner mode and the DC mode may be represented by 0 and 1, representatively. Each number in 2~H may represent a different angular prediction mode, wherein H is an integer greater than 2. Different angular prediction modes may be used to eliminate space redundancy in intra prediction.

In some embodiments, the filter may be used to filter reference pixels of the candidate prediction block to determine a predicted pixel value of each candidate pixel in the candidate prediction block. In some embodiments, the filter may include a plurality of filter types. For example, the plurality of filter types may include a weak filter type, a strong filter type, a type without a filter, or the like, or any combination thereof. In some embodiments, the strong filter type may consider more about surrounding pixels values of a current pixel than the weak filter type, and the weak filter type may consider more about the current pixel than the strong filter type. For example, the strong filter type may have greater weights for surrounding pixels values and less weight for the current pixel than those of the weak filter type. In some embodiments, the process for determining the filter may be found elsewhere (e.g., FIG. 5, or FIGS. 7-9 and the descriptions thereof) in the present disclosure.

In 440, the processing engine 112 (e.g., the processor 220) may determine, in the current prediction mode, a predicted pixel value of each candidate pixel in the candidate prediction block, based on the reference pixels and the filter.

In some embodiments, the processing engine 112 may obtain reference pixels of the candidate prediction block based on the angular prediction mode, filter the reference pixels using the filter, and determine, based on the filtered reference pixels, the predicted pixel value of each candidate pixel in the candidate prediction block. In some embodiments, the processing engine 112 may use the filter to filter the reference pixels and designate the filtered pixel value as the predicted pixel value of each candidate pixel in the candidate prediction block. In some embodiments, the process for determining the predicted pixel value of each candidate pixel in the candidate prediction block may be found elsewhere (e.g., FIGS. 10-11 and the descriptions thereof) in the present disclosure.

In some embodiments, the filter is determined by considering the size of the candidate prediction block. The filter for filtering reference pixels of a prediction block that is not a square may be selected accurately, and the filter effect of the prediction block that is not a square is improved.

It should be noted that the above description is merely provided for the purposes of illustration, and not intended to limit the scope of the present disclosure. For persons having ordinary skills in the art, multiple variations and modifications may be made under the teachings of the present disclosure. For example, a storage operation may be added after operation 440 for storing the predicted pixel value. However, those variations and modifications do not depart from the scope of the present disclosure.

Figure 5:
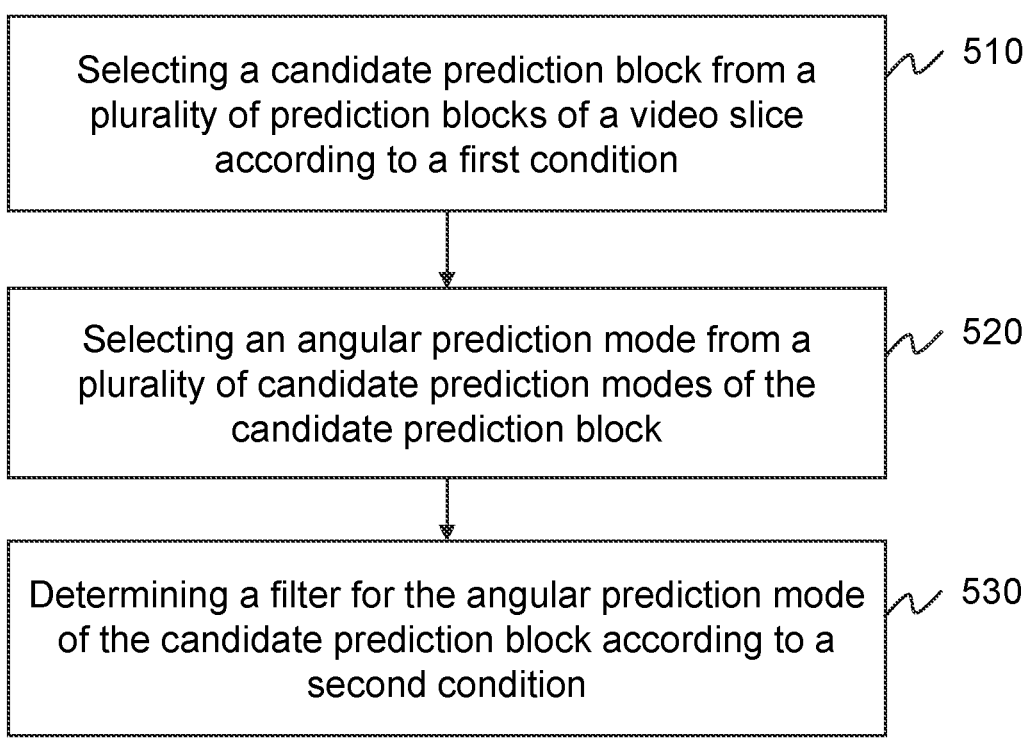
FIG. 5 is a flowchart illustrating an exemplary process for determining a filter according to some embodiments of the present disclosure.

FIG. 5 is a flowchart illustrating an exemplary process 500 for determining a filter according to some embodiments of the present disclosure. The process 500 may be executed by the system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220) may select a candidate prediction block from a plurality of prediction blocks of a video slice according to a first condition.

In some embodiments, the video slice may be an image frame of a video or part of the image frame. In some embodiments, the processing engine 112 may divide the video slice into the plurality of prediction blocks according to a block dividing process. Exemplary block dividing process may include a quadtree technique, a ternary tree technique, a binary tree technique, or the like, or any combination thereof.

In some embodiments, the processing engine 112 may select a prediction block that satisfies the first condition from the plurality of prediction blocks as the candidate prediction block. In some embodiments, the first condition may include a first aspect ratio condition associated with a ratio of a width of a prediction block to a height of the prediction block, a first side length condition associated with a maximum value or a minimum value between a width of the prediction block and a height of the prediction block, a distance condition associated with a diagonal distance of the prediction block, a logarithmic condition associated with a logarithmic function of the width of the prediction block and the height of the prediction block, or the like, or any combination thereof. For example, the first condition may be associated with a ratio of a width of the prediction block to a height of the prediction block, a logarithmic function of the width of the prediction block and the height of the prediction block, a maximum value between the width of the prediction block and the height of the prediction block, a minimum value between the width of the prediction block and the height of the prediction block, or the like, or any combination thereof.

In some embodiments, the first condition may be a0: unconditional. In some embodiments, the first condition may be associated with the first aspect ratio condition associated with a ratio of a width of the prediction block to a height of the prediction block and the logarithmic condition associated with a logarithmic function of the width of the prediction block and the height of the prediction block. For example, the first condition may include at least one of the following conditions of a1-a4:

a1: $m1 \geq \log 2size \geq m0$, and $n1 \geq w/d \geq n0$ or $1/n1 \leq w/d1/n0$;

a2: $m1 \geq \log 2size \geq m0$, and $w/d$ satisfies one of $w/d \geq n1$, $w/d \leq n0$, $w/s \leq 1/n1$, or $w/d \geq 1/n0$;

a3: $n1 \geq w/d \geq n0$ or $1/n1 \leq w/d \leq 1/n0$, and $\log 2size$ satisfies one of $\log 2size \geq m1$, or $\log 2size \leq m0$; or a4: $\log 2size$ satisfies one of $\log 2size \geq m1$, or $\log 2size \leq m0$, and $w/d$ satisfies one of $w/d \geq n1$, $w/d \leq n0$, $w/d \leq 1/n1$, or $w/d \geq 1/n0$.

In some embodiments, the first condition may be associated with the first aspect ratio condition associated with a ratio of a width of the prediction block to a height of the prediction block and the first side length condition associated with a maximum value or a minimum value between a width of the prediction block and a height of the prediction block. For example, the first condition may include at least one of the following conditions of a5-a12:

a5: $L1 \geq length0 \geq L0$, and $n1 \geq w/d \geq n0$ or $1/n1 \leq w/d \leq 1/n0$;

a6: $L1 \geq length0 \geq L0$, and w/d satisfies one of $w/d \geq n1$, $w/d \geq n0$, $w/d \leq 1/n1$, or $w/d \geq 1/n0$;

a7: $n1 \geq w/d \geq n0$ or $1/n1 \leq w/d \leq 1/n0$, and length0 satisfies one of $length0 \geq L1$, or $length0 \leq L0$;

a8: length0 satisfies one of $length0 \geq L1$, or $length0 \leq L0$, and w/d satisfies one of $w/d \geq n1$, $w/d \geq n0$, $w/d \leq 1/n1$, or $w/d \geq 1/n0$;

a9: $L1 \geq length1 \geq L0$, and $n1 \geq w/d \geq n0$ or $1/n1 \leq w/d1/n0$;

a10: $L1 \geq length1 \geq L0$, and w/d satisfies one of $w/d \geq n1$, $w/d \geq n0$, $w/d \leq 1/n1$, or $w/d \geq 1/n0$;

a11: $n1 \geq w/d \geq n0$ or $1/n1 \leq w/d \leq 1/n0$, and length1 satisfies one of $length1 \geq L1$, or $length1 \leq L0$; or a12: length1 satisfies one of $length1 \geq L1$, or $length1 \leq L0$, and w/d satisfies one of $w/d \geq n1$, $w/d \geq n0$, $w/d \leq 1/n1$, or $w/d \geq 1/n0$;

wherein log 2size denotes the logarithmic function of the width of the prediction block and the height of the prediction block. In some embodiments, the logarithmic function of the width of the prediction block and the height of the prediction block may be a logarithmic operation on the width of the prediction block and the height of the prediction block. For example, the logarithmic function of the width of the prediction block and the height of the prediction block may be log 2Size=(Log 2width+Log 2height])>>1, wherein width and height denote the width of the prediction block and the height of the prediction block, respectively; >> denotes shifting right. w/d denotes the ratio of the width of the prediction block to the height of the prediction block, length0 denotes the maximum value between the width of the prediction block and the height of the prediction block, and length1 denotes the minimum value between the width of the prediction block and the height of the prediction block. In some embodiments, L0 and L1 may be predetermined values. For example, L0=2, 4, 8, 16, 32, 64 . . . , L1=2, 4, 8, 16, 32, 64 . . . , and L1>=L0. m1, m0, n1, and n0 may be predetermined values. In some embodiments, m1 or m0=1, 2, 3, 4, 5, 6 . . . , and m1>=m0. n1 or n0=2, 4, 8, 16, 32 . . . , and n1>=n0.

In 520, the processing engine 112 (e.g., the processor 220) may select an angular prediction mode from a plurality of candidate prediction modes of the candidate prediction block.

In some embodiments, the plurality of candidate prediction modes may include a planar mode, a direct current (DC) mode, an angular prediction mode, or the like, or any combination thereof. The angular prediction mode may include a vertical angular mode, a horizontal angular mode, and any other prediction mode with an angle other than the vertical angular mode and the horizontal angular mode. In some embodiments, reference pixels under the planar mode, the DC mode, the vertical angular mode, and the horizontal angular mode may not be filtered. The angular prediction model used herein may include any other prediction mode other than the planar mode, the DC mode, the vertical angular mode, and the horizontal angular mode.

In some embodiments, the processing engine 112 may select the angular prediction mode that satisfies a first predetermined filtering range from the plurality of candidate prediction modes. In some embodiments, the first predetermined filtering range may include a prediction mode excluding the planar mode, the DC mode, the vertical angular prediction mode, and the horizontal angular prediction mode. In some embodiments, the angular prediction mode may be designated as the current prediction mode as described in FIG. 4 in the present disclosure.

Figure 6:
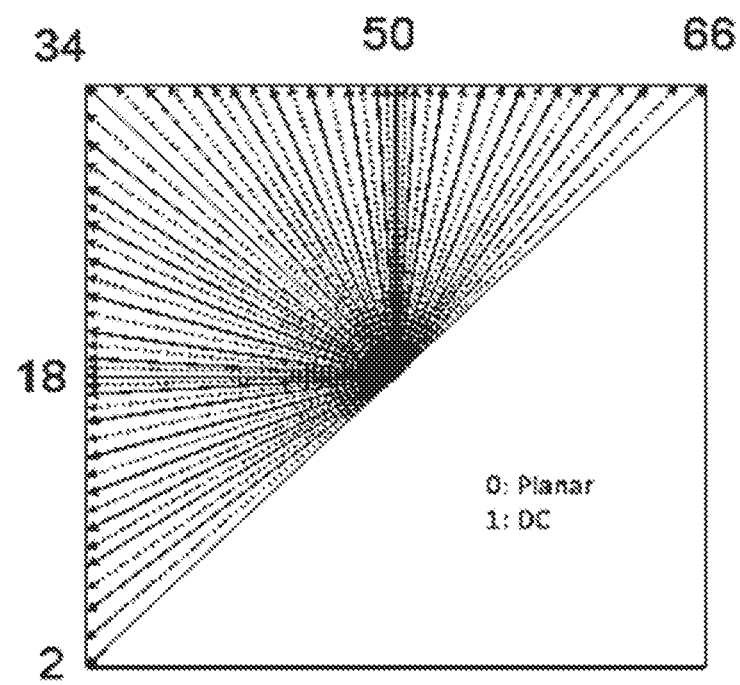
FIG. 6 is a schematic diagram illustrating exemplary prediction modes according to some embodiments of the present disclosure.

FIG. 6 is a schematic diagram illustrating exemplary prediction modes according to some embodiments of the present disclosure. As illustrated in FIG. 6, H=66, and different numbers represent different angular prediction modes. 2 represents an angular prediction mode points to a left-bottom corner or a diagonal in the third quadrant; 18 represents a horizontal angular prediction mode; 34 represents an angular prediction mode points to a left-top corner or a diagonal in the second quadrant; 50 represents a vertical angular prediction mode; and 66 represents an angular prediction mode points to a right-top corner or a diagonal in the first quadrant. As shown in FIG. 6, the first predetermined filtering range may include any one angular prediction mode represented from number 2 to 17, from 19 to 49, and from 51 to 66.

In 530, the processing engine 112 (e.g., the processor 220) may determine a filter for the angular prediction mode of the candidate prediction block according to a second condition.

In some embodiments, the processing engine 112 may determine the filter for filtering reference pixels of the candidate prediction block determined by the angular prediction mode according to the second condition. In some embodiments, the processing engine 112 may select a filter type of the filter using the second condition.

In some embodiments, the second condition may include a width condition associated with the width of the candidate prediction block, a height condition associated with the height of the candidate prediction block, a position condition associated with a position or a direction that the angular prediction mode is directed to, a second side length condition associated with a maximum value or a minimum value between the width of the candidate prediction block and the height of the candidate prediction block, a second aspect ratio condition associated with a ratio of the width of the candidate prediction block to the height of the candidate prediction block, a logarithmic condition associated with a logarithmic function of the width and the height of the candidate prediction block, or the like, or any combination thereof.

In some embodiments, since the candidate prediction block is not square, the filter types along the width direction and the height direction may be determined independently. For example, the second condition may include the width condition associated with the width of the candidate prediction block and the height condition associated with the height of the candidate prediction block. For example, the second condition may include a condition b0. The condition b0 may include the width condition for designating a logarithmic function of the width of the candidate prediction block as a first size parameter, and determining the filter for filtering reference pixels of the candidate prediction block along a width direction of the candidate prediction block based on the first size parameter and a predetermined rule; and the height condition for designating a logarithmic function of the height of the candidate prediction block as a second size parameter, and determining the filter for filtering reference pixels of the candidate prediction block along a height direction of the candidate prediction block based on the second size parameter and the predetermined rule. In some embodiments, the logarithmic function of the width of the candidate prediction block may be a logarithmic operation on the width of the prediction block. For example, the logarithmic function of the width of the prediction block may be log 2width=a. In some embodiments, the logarithmic function of the height of the candidate prediction block may be a logarithmic operation on the height of the prediction block. For example, the logarithmic function of the height of the prediction block may be log 2height=b.

In some embodiments, the second condition may include a condition b1 including the width condition associated with the width of the candidate prediction block, the height condition associated with the height of the candidate prediction block, and the position condition associated with a position or a direction that the angular prediction mode is directed to. For example, the condition b1 may include: determining whether the angular prediction mode is directed to a predetermined area, in response to a determination that the angular prediction mode is directed to the predetermined area, determining the filter as a first type of filter; in response to a determination that the angular prediction mode is not directed to the predetermined area, and determining the filter for filtering reference pixels of the candidate prediction block along the width direction of the candidate prediction block based on the first size parameter and the predetermined rule, and the filter for filtering reference pixels of the candidate prediction block along the height direction of the candidate prediction block based on the second size parameter and the predetermined rule, respectively. In some embodiments, the first type of filter may include a weak filter type. In some embodiments, the condition b1 may save computing resource compared with the condition b0.

In some embodiments, the predetermined area may be a part on the four quadrants representing the prediction modes. For example, the predetermined area may include a first vertical diagonal area, a first horizontal diagonal area, a second vertical diagonal area, a second horizontal diagonal area, a near-vertical area, a near-horizontal area, or the like, or any combination thereof. Taking H=66 as illustrated in FIG. 6 for example, the first vertical diagonal area may include a prediction mode, such as 34, 35, 65, 66, or the like, or any combination thereof. The first horizontal diagonal area may include a prediction mode, such as 2, 3, 33, 34, or the like, or any combination thereof.

In some embodiments, the processing engine 112 may determine the second vertical diagonal area, the second horizontal diagonal area, the near-vertical area, and/or the near-horizontal area according to the width and/or the height of the candidate prediction block. For example, the processing engine 112 may determine whether the width and/or the height of the candidate prediction block is 4, 8, 16, or 32, and determine the second vertical diagonal area, the second horizontal diagonal area, the near-vertical area, and/or the near-horizontal area based on a determination of the width and/or the height. In some embodiments, if the width of the candidate prediction block is 16, the near-vertical area may include prediction modes 42-47 and 53-58, and the second vertical diagonal area may include prediction modes 36-41 and 59-64. In some embodiments, if the width of the candidate prediction block is 32, the near-vertical area may include prediction modes 43-49 and 51-57, and the second vertical diagonal area may include prediction modes 36-42 and 58-64. In some embodiments, if the width of the candidate prediction block is 8 or 4, the near-vertical area may include no prediction mode, and the second vertical diagonal area may include no prediction mode. In some embodiments, if the height of the candidate prediction block is 16, the near-horizontal area may include prediction modes 9-15 and 21-26, and the second horizontal diagonal area may include prediction modes 4-8 and 27-32. In some embodiments, if the height of the candidate prediction block is 32, the near-horizontal area may include prediction modes 11-17 and 19-25, and the second horizontal diagonal area may include prediction modes 4-10 and 26-32. In some embodiments, if the height of the candidate prediction block is 8 or 4, the near-horizontal area may include no prediction mode, and the second horizontal diagonal area may include no prediction mode.

In some embodiments, the second condition may include a condition b2 including the second side length condition associated with a maximum value or a minimum value between the width of the candidate prediction block and the height of the candidate prediction block. For example, the condition b2 may include designating a logarithmic function of a maximum value between the width of the candidate prediction block and the height of the candidate prediction block as a third size parameter, and determining the filter for filtering reference pixels of the candidate prediction block based on the third size parameter and the predetermined rule. In some embodiments, the logarithmic function of the maximum value may be a logarithmic operation on the maximum value. For example, the logarithmic function of the maximum value may be log 2length0=c, wherein length0 denotes the maximum value between the width of the candidate prediction block and the height of the candidate prediction block. In some embodiments, the rectangular candidate prediction block with the maximum value length0 may be part of a square candidate prediction block with a side length length0. The processing engine 112 may select a filter type of the square candidate prediction block with the side length length0 as the filter type of rectangular candidate prediction block with the maximum value length0.

In some embodiments, the second condition may include a condition b3 including the second aspect ratio condition associated with the ratio of the width of the candidate prediction block to the height of the candidate prediction block. For example, the condition b3 may include determining whether the ratio w/d is less than a ratio threshold r or 1/r; in response to a determination that w/d≥r or w/d≤1/r, designating a logarithmic function of a minimum value between the width of the candidate prediction block and the height of the candidate prediction block as a fourth size parameter, and determining the filter for filtering reference pixels of the candidate prediction block based on the fourth size parameter and the predetermined rule; in response to a determination that w/d<r or w/d>1/r, determining the filter for filtering reference pixels of the candidate prediction block based on the third size parameter and the predetermined rule. In some embodiments, the ratio threshold r may be a predetermined value. For example, the ratio threshold r may be 2, 4, 8, 16, etc. In some embodiments, the logarithmic function of the minimum value between the width of the candidate prediction block and the height of the candidate prediction block may be a logarithmic operation on the minimum value. For example, the logarithmic function of the minimum value may be log 2length1=d, wherein length1 denotes the minimum value between the width of the candidate prediction block and the height of the candidate prediction block. In some embodiments, if the difference between the width and the height of the rectangular candidate prediction block is great, the processing engine 112 may determine that the rectangular candidate prediction block has weak characteristics of a square candidate prediction block, and a filter effect on a short side is little or counteractive. The processing engine 112 may determine the filter type of a square candidate prediction block with a side length of length1 as the filter type of the candidate prediction block.

In some embodiments, the second condition may include a condition b4 including the logarithmic condition associated with a logarithmic function of the width and the height of the candidate prediction block. For example, the condition b4 may include designating a logarithmic function of the width of the candidate prediction block and the height of the candidate prediction block as a fifth size parameter, and determining the filter for filtering reference pixels of the candidate prediction block based on the fifth size parameter and the predetermined rule. In some embodiments, the logarithmic function of the width of the candidate prediction block and the height of the candidate prediction block may be a logarithmic operation on the width and the height of the candidate prediction block. For example, the logarithmic function of the width and the height of the candidate prediction block may be log 2Size.

In some embodiments, the predetermined rule may include a rule for determining whether a size parameter of the first size parameter, the second size parameter, the third size parameter, the fourth size parameter, and/or the fifth size parameter is in or beyond one or more ranges. In some embodiments, an exemplary predetermined rule may be found elsewhere (e.g., FIG. 7 and the descriptions thereof) in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. For example, a storage operation may be added after operation 530 for storing the filter. However, those variations and modifications do not depart from the scope of the present disclosure.

Figure 7:
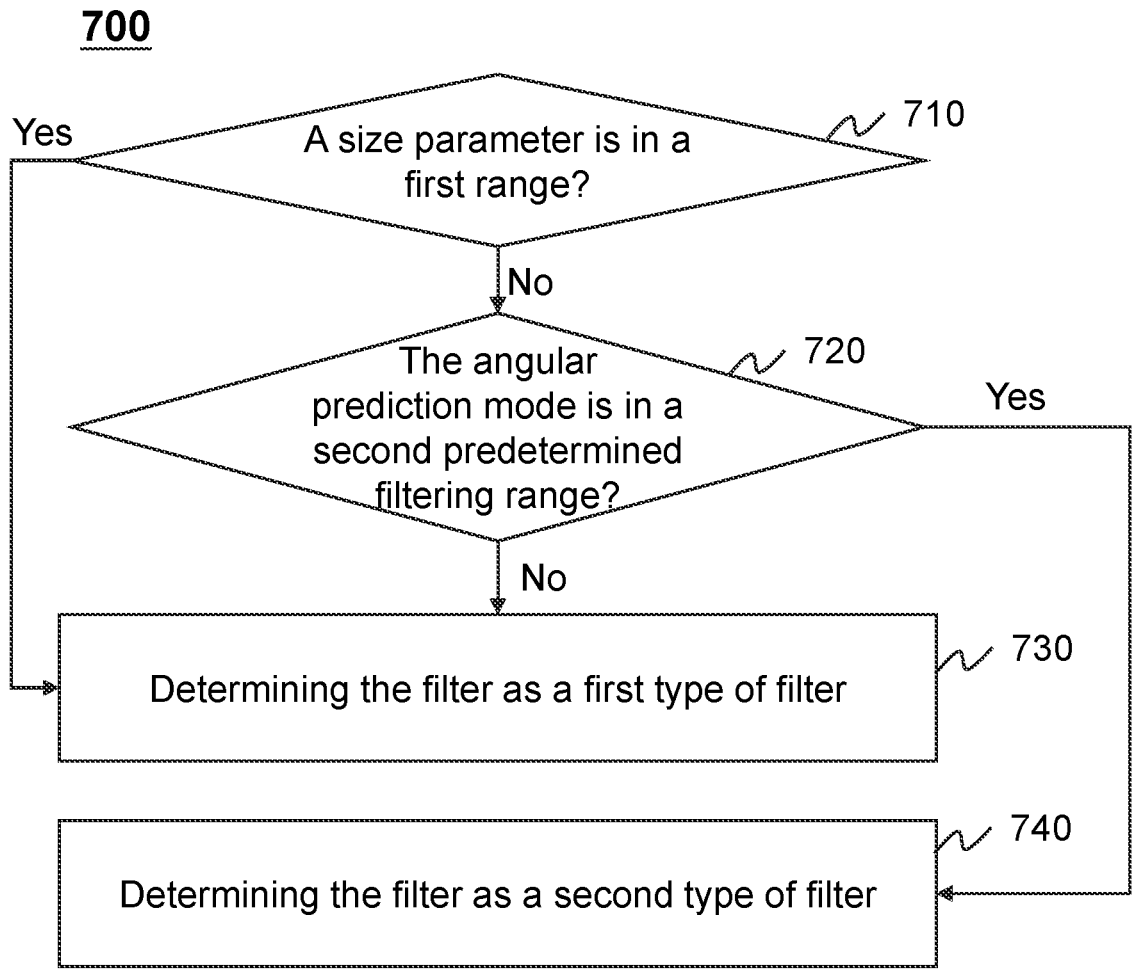
FIG. 7 is a flowchart illustrating an exemplary process of a predetermined rule according to some embodiments of the present disclosure.

FIG. 7 is a flowchart illustrating an exemplary process 700 of a predetermined rule according to some embodiments of the present disclosure. The process 700 may be executed by the system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220) may determine whether a size parameter is in a first range.

In some embodiments, the size parameter may include the first size parameter, the second size parameter, the third size parameter, the fourth size parameter, and/or the fifth size parameter, or the like, or any combination thereof. In some embodiments, the first range may include size parameters 2, 6, or the like, or any combination thereof.

In 720, in response to a determination that the size parameter is not in the first range, the processing engine 112 (e.g., the processor 220) may determine whether the angular prediction mode is in a second predetermined filtering range.

For example, if the size parameter is beyond the first range, the processing engine 112 may determine whether the angular prediction mode is in the second predetermined filtering range. In some embodiments, the second predetermined filtering range may be determined according to the size parameter. For example, if the size parameter equals to 3, the second predetermined filtering range may include prediction modes such as 2, 3, 33, 34, 35, 65, 66, or the like, or any combination thereof. As another example, if the size parameter equals to 4, the second predetermined filtering range may include prediction modes such as 2-15, 21-47, 53-66, or the like, or any combination thereof. As still another example, if the size parameter equals to 5, the second predetermined filtering range may include prediction modes such as 2-17, 19-49, 51-66, or the like, or any combination thereof.

In 730, in response to a determination that the size parameter is in the first range or in response to a determination that the size parameter is not in the first range and the angular prediction mode is not in the second predetermined filtering range, the processing engine 112 (e.g., the processor 220) may determine the filter as a first type of filter. In some embodiments, the first type of filter may include a weak filter type.

In 740, in response to a determination that the size parameter is not in the first range and the angular prediction mode is in the second predetermined filtering range, the processing engine 112 (e.g., the processor 220) may determine the filter as a second type of filter. In some embodiments, the second type of filter may include a strong filter type.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

In some embodiments, the first condition and the second condition may be used in any combination to determine the filter. For example, filter types of different sizes of candidate prediction blocks under different angular prediction modes may be determined after determining the first condition and the second condition. In some embodiments, the mapping relationship among a prediction block (with size parameters), an angular prediction mode, and a filter type may be stored in a storage device, and the processing engine 112 may access the storage device to look up the filter type when determining a filter type of a same size of block under a same angular prediction mode. In some embodiments, the processing engine 112 may update the mapping relationship when any one of the prediction block (with size parameters), the angular prediction mode, and the filter type are changed.

Merely by way of example, the first condition may be a5: L1≥length0≥L0, and n1≥w/d≥n0 or 1/n1≤w/d≤1/n0, and the second condition may be b0. L0=8, L1=32, n0=2, and n1=8. Candidate prediction blocks and angular prediction modes that use the second type of filter (strong filter type) may be illustrated as TAB. 1.

TAB. 1

| Width*height of a candidate prediction block | Angular prediction mode along the width direction that uses a strong filter type | Angular prediction mode along the height direction that uses a strong filter type |
| --- | --- | --- |
| 4*8 | none | 2, 3, 33, 34 |
| 4*16 | none | 2-15, 21-34 |
| 4*32 | none | 2-17, 19-34 |
| 8*4 | 34, 35, 65, 66 | none |
| 8*16 | 34, 35, 65, 66 | 2-15, 21-34 |
| 8*32 | 34, 35, 65, 66 | 2-17, 19-34 |
| 16*4 | 34-47, 53-66 | none |

TAB. 1-continued

| Width*height of a candidate prediction block | Angular prediction mode along the width direction that uses a strong filter type | Angular prediction mode along the height direction that uses a strong filter type |
|---|---|---|
| 16*8 | 34-47, 53-66 | 2, 3, 33, 34 |
| 16*32 | 34-47, 53-66 | 2-17, 19-34 |
| 32*4 | 34-49, 51-66 | none |
| 32*8 | 34-49, 51-66 | 2, 3, 33, 34 |
| 32*16 | 34-49, 51-66 | 2-15, 21-34 |

Figure 8:
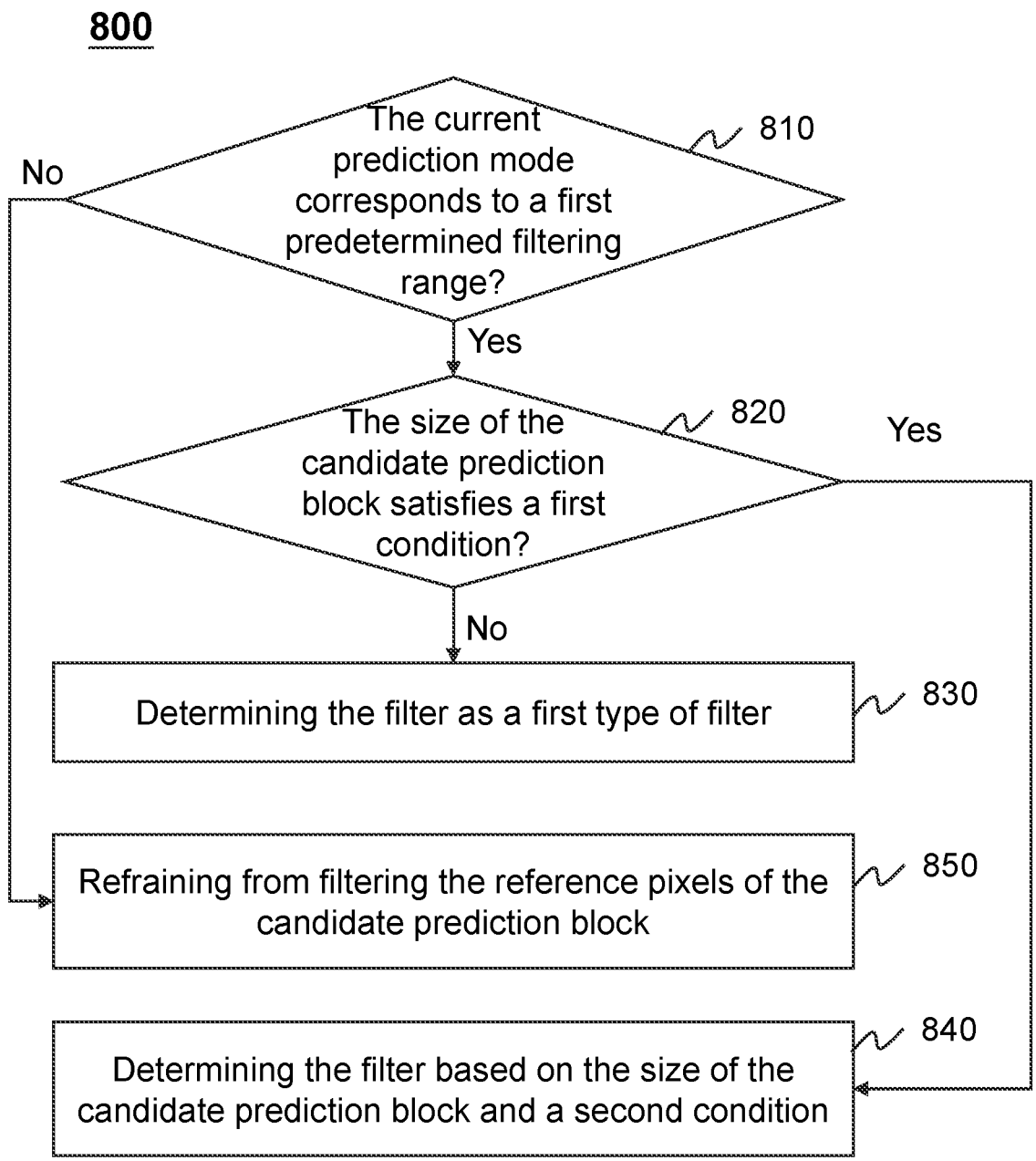
FIG. 8 is a flowchart illustrating an exemplary process for determining a filter according to some embodiments of the present disclosure.

FIG. 8 is a flowchart illustrating an exemplary process 800 for determining a filter according to some embodiments of the present disclosure. The process 800 may be executed by the system 100. For example, the process 800 may be implemented as a set of instructions (e.g., an application) stored in the storage ROM 230 or the RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220) may determine whether the current prediction mode corresponds to a first predetermined filtering range. In some embodiments, the process for determining whether the current prediction mode corresponds to the first predetermined filtering range may be found elsewhere (e.g., FIG. 5 and the descriptions thereof) in the present disclosure.

In 820, in response to a determination that the current prediction mode corresponds to the first predetermined filtering range, the processing engine 112 (e.g., the processor 220) may determine whether the size of the candidate prediction block satisfies a first condition. In some embodiments, the process for determining whether the size of the candidate prediction block satisfies the first condition may be found elsewhere (e.g., FIG. 5 and the descriptions thereof) in the present disclosure.

In 830, in response to a determination that the current prediction mode corresponds to the first predetermined filtering range and the size of the candidate prediction block does not satisfy the first condition, the processing engine 112 (e.g., the processor 220) may determine the filter as the first type of filter.

In 840, in response to a determination that the current prediction mode corresponds to the first predetermined filtering range and the size of the candidate prediction block satisfies the first condition, the processing engine 112 (e.g., the processor 220) may determine the filter based on the size of the candidate prediction block and a second condition. In some embodiments, the process for determining the filter based on the size of the candidate prediction block and the second condition may be found elsewhere (e.g., FIGS. 5-7 and the descriptions thereof) in the present disclosure.

In 850, in response to a determination that the current prediction mode is not in the first predetermined filtering range and the size of the candidate prediction block satisfies the first condition, the processing engine 112 (e.g., the processor 220) may refrain from filtering the reference pixels of the candidate prediction block. In some embodiments, reference pixels under the planar mode, the DC mode, the vertical angular mode, and the horizontal angular mode may not be filtered.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 800.

Figure 9:
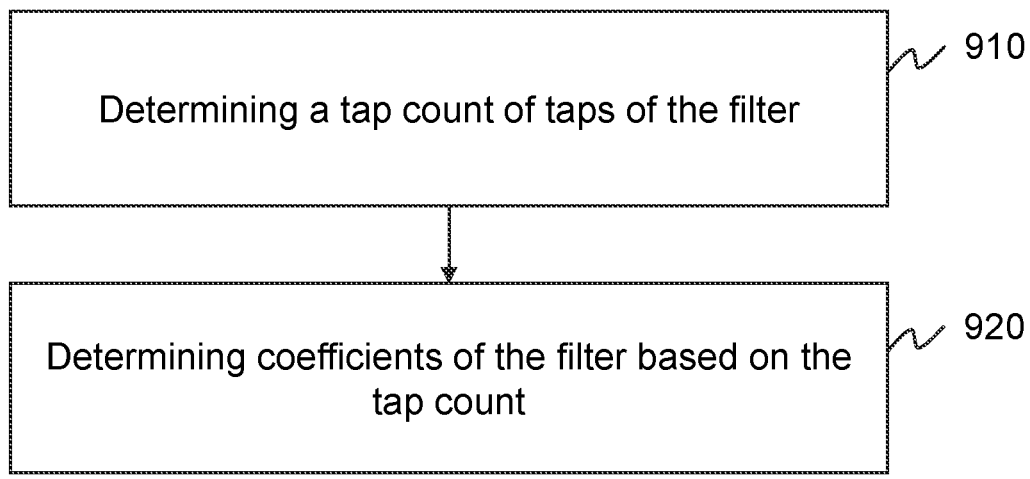
FIG. 9 is a flowchart illustrating an exemplary process for determining a filter according to some embodiments of the present disclosure.

FIG. 9 is a flowchart illustrating an exemplary process 900 for determining a filter according to some embodiments of the present disclosure. The process 900 may be executed by the system 100. For example, the process 900 may be implemented as a set of instructions (e.g., an application) stored in the storage ROM 230 or the RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220) may determine a tap count of taps of the filter. In 920, the processing engine 112 (e.g., the processor 220) may determine coefficients of the filter based on the tap count.

In some embodiments, the filter may include a plurality of first type (weak filter type) of filters, a plurality of second type (strong filter type) of filters, or the like, or any combination thereof. In some embodiments, the processing engine 112 may determine a first tap count of taps of a first type of filter or a second tap count of taps of a second type of filter. In some embodiments, the first tap count T of taps of the filter may be no less than 4.

In some embodiments, each first type of filter may correspond to a set of first coefficients. In some embodiments, a first filter count I of the set of first type of filters may be no less than 8, and each set of first coefficients f[t] may include T coefficients corresponding to T reference pixels of the candidate prediction block, in which t may be an integer in a range from 0 to (I−1). For example, the first filter count I may be $2^3$, $2^4$, $2^5$, $2^6$, $2^7$, etc.

In some embodiments, the processing engine 112 may determine whether the first tap count T is an odd integer. In response to a determination that T is an odd integer, the T reference pixels may include a current reference pixel and (T−1)/2 reference pixels on each side of the current reference pixel, and $f[t]=\{a_{t,0}, \ldots, a_{t,(T-1)/2}, \ldots, a_{t,(T-1)}\}$. In some embodiments, in f(0), $a_{0,(T-1)/2} \geq 2^{T-3} * I$ and other coefficients may all equal to 0. In some embodiments, $a_{t,0}+a_{t,1}+ \quad . \quad . \quad . \quad +a_{t,(T-1)/2}=-\text{round}(t*2^{T-6})$, $a_{t,(T-1)/2+2}+ \ldots +a_{t,T-2}+a_{t,T-1}=-\text{floor}(t*2^{T-6})$, in f[0]~f[I/2], $(a_{t,0}+a_{t,1}+ \ldots +a_{t,T/2-1}) \geq (a_{t,T/2}+ \ldots +a_{t,T-2}+a_{t,T-1})$, in f[I/2]~f[I−1], $(a_{t,0}+a_{t,1}+ \ldots +a_{t,T/2-1}) < (a_{t,T/2}+ \ldots +a_{t,T-2}+a_{t,T-1})$, in f[t], $a_{t,(T-1)/2}=a_{0,(T-1)/2}-t-\text{floor}(t*2^{T-6})$ (t!=0), and $a_{t,(T-1)/2+1}=t-\text{round}(t*2^{T-6})$ (t!=0). In some embodiments, coefficients $a_{t,0}, a_{t,1}, \ldots, a_{t,(T-1)/2-1}$ may decrease successively, a difference between two adjacent coefficients of $a_{t,0}$, $a_{t,1}, \ldots, a_{t,(T-1)/2-1}$ may increase successively, coefficients $a_{t,\frac{T-1}{2}+1}, a_{t,\frac{T-1}{2}+2},$ $\ldots, a_{t,(T-1)}$ may increase successively, a difference between two adjacent coefficients of $a_{t,\frac{T-1}{2}+1}, a_{t,\frac{T-1}{2}+2},$ $\ldots, a_{t,(T-1)}$ may decrease successively, and a sum of the coefficients $a_{t,0}, \ldots, a_{t,(T-1)/2}, \ldots, a_{t,(T-1)}$ may equal to $a_{0,(T-1)/2}$. In some embodiments, the difference between two adjacent coefficients may refer to a weight difference between two weights for two adjacent pixels. The shorter distance from a pixel to a center pixel, the greater the weight difference between the pixel and its adjacent pixel.

In some embodiments, in response to a determination that T is an even integer, the T reference pixels may include a current reference pixel, (T/2−1) reference pixels in a coding direction, and T/2 reference pixels in a reverse coding direction, and $f[t]=\{a_{t,0}, \ldots a_{t,(T/2-1)}, \ldots, a_{t,(T-1)}\}$. In some embodiments, in f[0], the coefficients may satisfy $a_{0,T/2-1} >= 2^{T-3}*I$, and other coefficients may all equal to 0. In some embodiments, $a_{t,0}+\ldots+a_{t,T/2-2}=-\text{round}(t*2^{T-6})$, and $a_{t,T/2+1}+\ldots+a_{t,T-2}+a_{t,T-1}=-\text{floor}(t*2^{T-6})$, and in f[0]~f[1/2], $(a_{t,0}+a_{t,1}+\ldots+a_{t,T/2-1}) >= (a_{t,T/2}+\ldots+a_{t,T-2}+a_{t,T-1})$. In f[1/2]~f[1−1], $(a_{t,0}+\ldots+a_{t,T/2-1}) < (a_{t,T/2}+\ldots+a_{t,T-2}+a_{t,T-1})$ and in f[t], $a_{t,T/2-1}=a_{0,T/2-1}-t-\text{floor}(t*2^{T-6})$ (t!=0), $a_{t,T/2}=t-\text{round}(t*2^{T-6})$ (t!=0). In some embodiments, round( ) may denote a rounding calculation and floor( ) may denote a down round calculation. In some embodiments, coefficients $a_{t,0}, a_{t,1}, \ldots,$ $a_{t,\frac{T}{2}-2}$ may decrease successively, a difference between two adjacent coefficients of $a_{t,0}, a_{t,1}, \ldots,$ $a_{t,\frac{T}{2}-2}$ may increase successively, coefficients $a_{t,(T/2+1)}, a_{t,(T/2+2)}, \ldots, a_{t,(T-1)}$ may increase successively, a difference between two adjacent coefficients of $a_{t,(T/2+1)}, a_{t,(T/2+2)}, \ldots, a_{t,(T-1)}$ may decrease successively, and a sum of the coefficients $a_{t,0}, \ldots$ $a_{t,(\frac{T}{2}-1)},$ $\ldots, a_{t,(T-1)}$ may equal to $a_{0,(T/2-1)}$. In some embodiments, the difference between two adjacent coefficients may refer to a weight difference between two weights for two adjacent pixels. The shorter distance from a pixel to a center pixel, the higher the weight of the pixel.

Merely by way of example, the first tap count of taps of a first type of filter may be T=4, and the first filter count l=32. In f(0), $a_{0,1}=64$, and other coefficients may all equal to 0. Other f(t) rather than f(0) may satisfy $a_{t,0}=-\text{round}(t*2^{-2})$, $a_{t,1}=64-t-\text{floor}(t*2^{-2})$, $a_{t,2}=t-\text{round}(t*2^{-2})$, $a_{t,3}=-\text{floor}(t*2^{-2})$ (t!=0).

In some embodiments, the processing engine 112 may determine a second tap count of taps of a second type of filter. In some embodiments, the second tap count T of taps of the filter may be no less than 3. In some embodiments, each second type of filter may correspond to a set of second coefficients. In some embodiments, a second filter count I of the set of second type of filters may be no less than 8, and each set of second coefficients f[t] may include T coefficients corresponding to T reference pixels of the candidate prediction block, in which t may be an integer in a range from 0 to (l−1). For example, the second filter count l may be $2^3$, $2^4$, $2^5$, $2^6$, $2^7$, etc.

In some embodiments, the processing engine 112 may determine whether the second tap count T is an odd integer. In response to a determination that T is an odd integer, the T reference pixels may include a current reference pixel and (T−1)/2 reference pixels on each side of the current reference pixel, and $f[t]=\{a_{t,0}, \ldots, a_{t,(T-1)/2}, \ldots, a_{t,(T-1)}\}$. In some embodiments, all $a_{t,(T-1)/2}$ may equal to a same constant to different t. In some embodiments, $a_{t,(T-1)/2} >= 2^{T-2}*I$ and $a_{0,T-1}=a_{0,0} >= I$ in f(0). Other coefficients other than f(0), $a_{t,0}=a_{t-1,0}-1$ (t!=0), $a_{t,T-1}=a_{t-1,T-1}+1$ (t!=0), and $a_{0,0}+\ldots+a_{0,(T-1)/2-1}=a_{0,(T-1)/2+1}+\ldots+a_{0,T-2}+a_{0,T-1}=a_{t,(T-1)/2}/2$. In some embodiments, coefficients $a_{t,0}, a_{t,1}, \ldots, a_{t,(T-1)/2-1}$ may increase successively, a difference between two adjacent coefficients of $a_{t,0}, a_{t,1}, \ldots, a_{t,(T-1)/2-1}$ may increase successively, coefficients $a_{t,(T-1)/2+1}, a_{t,(T-1)/2+2}, \ldots, a_{t,(T-1)}$ may decrease successively, a difference between two adjacent coefficients of $a_{t,(T-1)/2+1}, a_{t,(T-1)/2+2}, \ldots, a_{t,(T-1)}$ may decrease successively, and a sum of the coefficients $a_{t,0}, \ldots, a_{t,(T-1)/2}, \ldots, a_{t,(T-1)}$ may equal to $2*a_{t,(T-1)/2}$. In some embodiments, the difference between two adjacent coefficients may refer to a weight difference between two weights for two adjacent pixels. The shorter distance from a pixel to a center pixel, the greater the weight difference between the pixel and its adjacent pixel.

In some embodiments, in response to a determination that T is an even integer, the T reference pixels may include a current reference pixel, (T/2−1) reference pixels in a coding direction, and T/2 reference pixels in a reverse coding direction, and $f[t]=\{a_{t,0}, \ldots, a_{t,(T/2-1)}, \ldots, a_{t,(T-1)}\}$. In some embodiments, in f[0], the coefficients may satisfy $a_{0,T/2-1} >= 2^{T-2}*I$, $a_{0,T-1}=0$, and $$a_{0,0} + \ldots + a_{0,(\frac{T}{2}-2)} = a_{0,\frac{T}{2}} + \ldots + a_{0,T-2} + a_{0,T-1} = a_{0,(\frac{T}{2}-1)}/2.$$

In some embodiments, $a_{t,T-1} >= t*2^{T-2}*I/64$ (t!=0), $a_{t,T/2-1}=a_{t-1,T/2-1}-2^{T-2}*I/64$ (t!=0). In some embodiments, coefficients $a_{t,0}, a_{t,1}, \ldots, a_{t,(T/2-2)}$ may increase successively, a difference between two adjacent coefficients of $a_{t,0}, a_{t,1}, \ldots, a_{t,(T/2-2)}$ may increase successively, and $$a_{t,i} = a_{t-1,i} - 2^{T-2} * \frac{I}{64},$$

i=0~(T/2−2)(t!=0). In some embodiments, coefficients $a_{t,(T/2+1)}, a_{t,(T/2+2)}, \ldots, a_{t,(T-1)}$ may decrease successively, a difference between two adjacent coefficients of $a_{t,(T/2+1)}, a_{t,(T/2+2)}, \ldots, a_{t,(T-1)}$ may decrease successively, and $$a_{t,i} = a_{t-1,i} + 2^{T-2} * \frac{I}{64}, i = \frac{T}{2} \sim (T-2)(t!=0).$$

In some embodiments, a sum of the coefficients $a_{t,0}, \ldots, a_{t,(T/2-1)}, \ldots, a_{t,(T-1)}$ may equal to $2*a_{0,(T-1)/2}$. In some embodiments, the difference between two adjacent coefficients may refer to a weight difference between two weights for two adjacent pixels. The shorter distance from a pixel to a center pixel, the higher the weight of the pixel.

Merely by way of example, the second tap count of taps of a second type of filter may be T=5, and the first filter count l=32. $a_{t,2}=256$, and in f(0), $a_{0,0}=a_{0,4}=(2^{T+3}-1)/2^{T-1}=48$, $a_{0,1}=a_{0,3}=a_{0,2}/2-a_{0,0}=80$. Other f(t) rather than f(0) may satisfy $a_{t,0}=a_{t-1,0}-1$, $a_{t,1}=a_{t-1,1}-1$, $a_{t,3}=a_{t-1,3}+1$, $a_{t,4}=a_{t-1,4}+1$ (t!=0).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 900.

Figure 10:
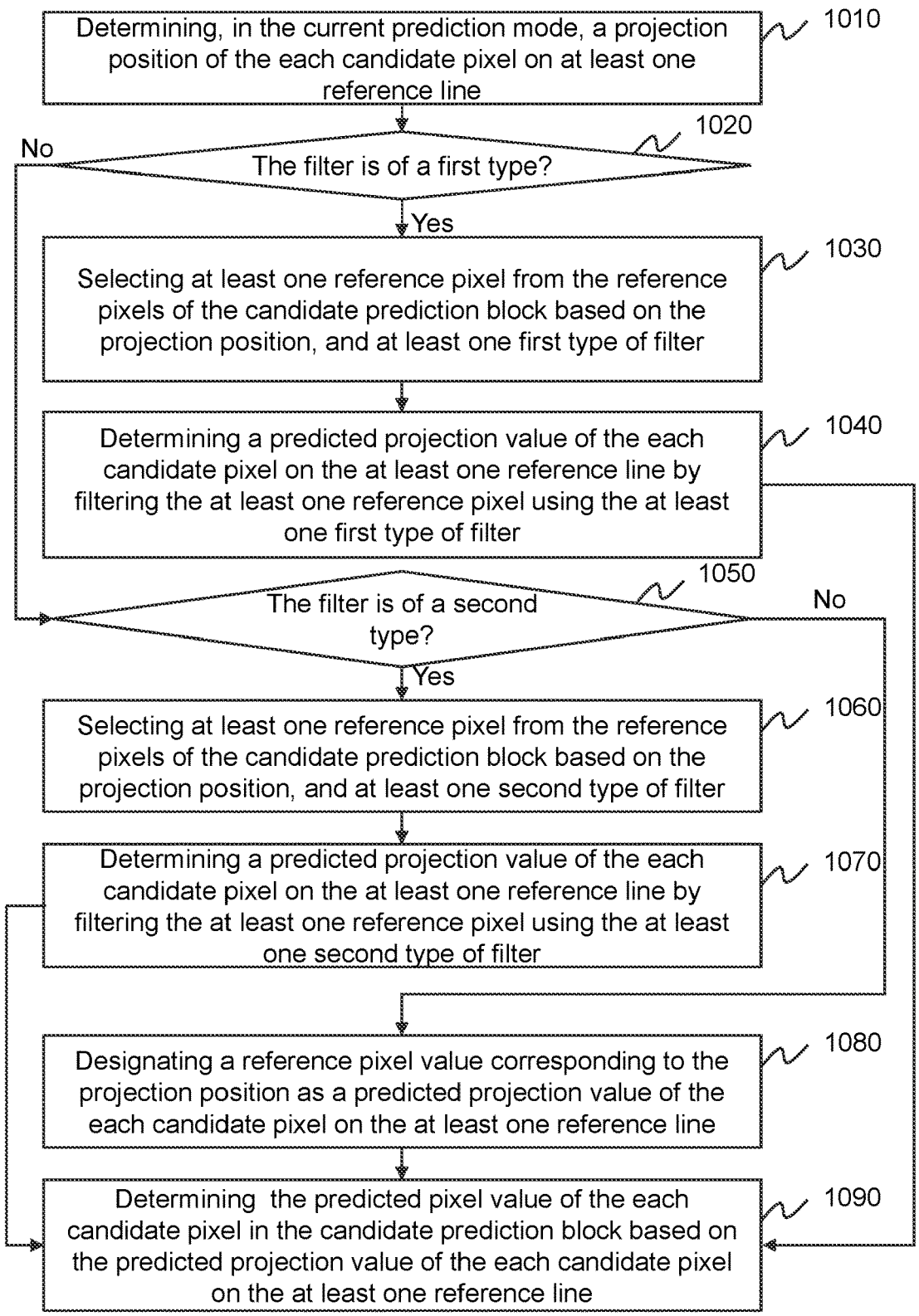
FIG. 10 is a flowchart illustrating an exemplary process for determining a predicted value of each candidate pixel in a candidate prediction block according to some embodiments of the present disclosure.

FIG. 10 is a flowchart illustrating an exemplary process 1000 for determining a predicted value of each candidate pixel in a candidate prediction block according to some embodiments of the present disclosure. The process 1000 may be executed by the system 100. For example, the process 1000 may be implemented as a set of instructions (e.g., an application) stored in the storage ROM 230 or the RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220) may determine, in the current prediction mode, a projection position of the each candidate pixel on at least one reference line.

In some embodiments, the each candidate pixel may be projected to the at least one reference line along a projection direction to obtain the projected position on the reference line. The projection direction may include a direction of the current angular prediction mode, a reverse direction of the current angular prediction mode, or the like, or any combination thereof. In some embodiments, the direction of a vector of a candidate pixel as a starting point and the projection position as an ending point may be the same as the projection direction.

In 1020, the processing engine 112 (e.g., the processor 220) may determine whether the filter is of a first type.

In 1030, in response to a determination the filter is of the first type, the processing engine 112 (e.g., the processor 220) may select at least one reference pixel from the reference pixels of the candidate prediction block based on the projection position, and at least one first type of filter.

In some embodiments, the processing engine 112 may select the at least one reference pixel at the projection position. The processing engine 112 may select the at least one first type of filter from the set of first type of filter.

In 1040, the processing engine 112 (e.g., the processor 220) may determine a predicted projection value of the each candidate pixel on the at least one reference line by filtering the at least one reference pixel using the at least one first type of filter.

In some embodiments, the processing engine 112 may use the selected at least one first type of filter to filter the selected at least one reference pixel to obtain the predicted projection value of the each candidate pixel on the at least one reference line.

In 1050, in response to a determination the filter is not of the first type, the processing engine 112 (e.g., the processor 220) may determine whether the filter is of a second type.

In 1060, in response to a determination the filter is of the second type, the processing engine 112 (e.g., the processor 220) may select at least one reference pixel from the reference pixels of the candidate prediction block based on the projection position, and at least one second type of filter.

In some embodiments, the processing engine 112 may select the at least one reference pixel at the projection position. The processing engine 112 may select the at least one second type of filter from the set of second type of filter.

In 1070, the processing engine 112 (e.g., the processor 220) may determine a predicted projection value of the each candidate pixel on the at least one reference line by filtering the at least one reference pixel using the at least one second type of filter.

In some embodiments, the processing engine 112 may use the selected at least one second type of filter to filter the selected at least one reference pixel to obtain the predicted projection value of the each candidate pixel on the at least one reference line.

In some embodiments, in operations 1040 and 1070, if there is just a reference pixel at the projected position, the reference pixel at the projected position may be used as a reference pixel. If there is not a reference pixel at the projected position, the processing engine 112 may select two closest pixels at left or upper side of the projected position along the reference line, and determine an equivalence pixel value (e.g., an interpolation of the two closest pixel values) as the a reference pixel of the projected position. When the encoding order is from left to right and from top to bottom, the coding direction of the current reference pixel may be the left or upper side of the current reference pixel, and the reverse coding direction of the current reference pixel may be the right or lower side of the current reference pixel. In some embodiments, the processing engine may select a suitable filter for the candidate prediction block to save computing resources.

In 1080, in response to a determination the filter is not of the second type, the processing engine 112 (e.g., the processor 220) may designate a reference pixel value corresponding to the projection position as a predicted projection value of the each candidate pixel on the at least one reference line.

In some embodiments, in response to a determination that the reference pixels of the candidate prediction block are refrained from filtering, the processing engine 112 may proceed 1080. In some embodiments, the processing engine 112 may not filter reference pixels.

In 1090, the processing engine 112 (e.g., the processor 220) may determine the predicted pixel value of the each candidate pixel in the candidate prediction block based on the predicted projection value of the each candidate pixel on the at least one reference line.

In some embodiments, after determining the predicted projection value of the each candidate pixel on the at least one reference line based on the filter of the first type, the second type, or without filter, the processing engine 112 may determine the predicted pixel value of the each candidate pixel in the candidate prediction block.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1000. In some embodiments, operations 1020 and 1050 may be omitted. For example, the processing engine 112 may determine a type of the filter at operation 1020, and proceed operation 1030 in response to a determination that the filter is of the first type, proceed operation 1060 in response to a determination that the filter is of the second type, and proceed operation 1080 in response to a determination that the reference pixels of the candidate prediction block are refrained from filtering.

Figure 11:
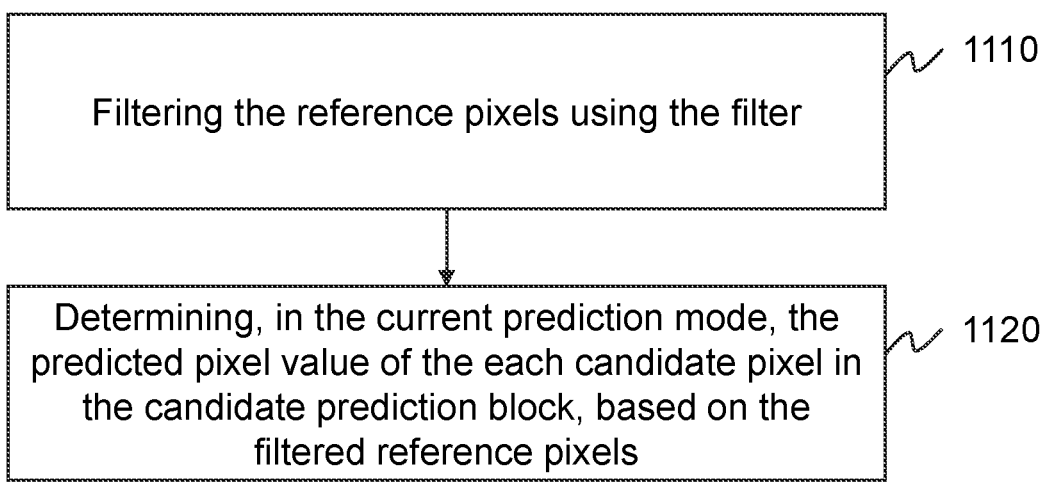
FIG. 11 is a flowchart illustrating an exemplary process for determining a predicted value of each candidate pixel in a candidate prediction block according to some embodiments of the present disclosure.

FIG. 11 is a flowchart illustrating an exemplary process 1100 for determining a predicted value of each candidate pixel in a candidate prediction block according to some embodiments of the present disclosure. The process 1100 may be executed by the system 100. For example, the process 1100 may be implemented as a set of instructions (e.g., an application) stored in the storage ROM 230 or the RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processing engine 112 (e.g., the processor 220) may filter the reference pixels using the filter.

In some embodiments, the processing engine 112 may select one of the filters determined in FIG. 9 in the present disclosure to filter the reference pixels.

In 1120, the processing engine 112 (e.g., the processor 220) may determine, in the current prediction mode, the predicted pixel value of the each candidate pixel in the candidate prediction block, based on the filtered reference pixels.

In some embodiments, the processing engine 12 may filter the reference pixels after determining the pixel values of the reference pixels. The pixel values of the reference pixels before filtering and after filtering (by a first type of filter or a second type of filter) may be stored in a storage device. The processing engine 112 may access the storage device to obtain the corresponding pixel value of a certain prediction block under a certain angular prediction mode. Repetitive computing is avoided and computing resources are saved.

In some embodiments, the processing engine 112 may traverse each prediction mode to determine a filter for each prediction block under the prediction mode. The processing engine 112 may determine an evaluation index (e.g., a rate-distortion cost) of each prediction mode for intra prediction, and select a prediction mode that has a certain evaluation index (e.g., a least rate-distortion cost) as a final prediction mode for intra prediction.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or orders, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for intra prediction, comprising:
at least one storage medium including a set of instructions for intra prediction; and
at least one processor in communication with the storage medium, wherein when executing the set of instructions, the at least one processor is directed to perform operations including:
selecting a candidate prediction block from a plurality of prediction blocks of a video slice according to a first condition, wherein a width of the candidate prediction block is different from a height of the candidate prediction block;
selecting an angular prediction mode from a plurality of candidate prediction modes of the candidate prediction block; and
determining a filter for the angular prediction mode of the candidate prediction block according to a second condition, wherein
the second condition is associated with the width of the candidate prediction block or the height of the candidate prediction block, and
the first condition includes at least one of:
a0: unconditional;
a1: m1≥log 2size≥m0, and n1≥w/d≥n0 or 1/n1≤w/d≤1/n0;
a2: m1≥log 2size≥m0, and w/d satisfies one of w/d≥n1, w/d≤n0, w/d≤1/n1, or w/d≥1/n0;
a3: n1≥w/d≥n0 or 1/n1≤w/d≤1/n0, and log 2size satisfies one of log 2size≥m1, or log 2size≤m0;
a4: log 2size satisfies one of log 2size≥m1, or log 2size≤m0, and w/d satisfies one of w/d≥n1, w/d≤n0, w/d≤1/n1, or w/d≥1/n0;
a5: L1≥length0≥L0, and n1≥w/d≥n0 or 1/n1≤w/d≤1/n0;
a6: L1≥length0≥L0, and w/d satisfies one of w/d≥n1, w/d≤n0, w/d≤1/n1, or w/d≥1/n0;
a7: n1≥w/d≥n0 or 1/n1≤w/d≤1/n0, and length0 satisfies one of length0≥L1, or length0≤L0;
a8: length0 satisfies one of length0≥L1, or length0≤L0, and w/d satisfies one of w/d≥n1, w/d≤n0, w/d≤1/n1, or w/d≥1/n0;
a9: L1≥length1≥L0, and n1≥w/d≥n0 or 1/n1≤w/d≤1/n0;
a10: L1≥length1≥L0, and w/d satisfies one of w/d≥n1, w/d≤n0, w/d≤1/n1, or w/d≥1/n0;
a11: n1≥w/d≥n0 or 1/n1≤w/d≤1/n0, and length1 satisfies one of length1≥L1, or length1≤L0; or
a12: length1 satisfies one of length1≥L1, or length1≤L0, and w/d satisfies one of w/d≥n1, w/d≤n0, w/d≤1/n1, or w/d≥1/n0;
wherein
log 2size is the logarithmic function of the width of the prediction block and the height of the prediction block,
w/d is the ratio of the width of the prediction block to the height of the prediction block, length0 is the maximum value between the width of the prediction block and the height of the prediction block, length1 is the minimum value between the width of the prediction block and the height of the prediction block, and L0, L1, m1, m0, n1, and n0 are predetermined values.

2. The system of claim 1, wherein the first condition includes a first aspect ratio condition associated with a ratio of a width of a prediction block to a height of the prediction block.

3. The system of claim 1, wherein the first condition includes a first side length condition associated with a maximum value or a minimum value between a width of a prediction block and a height of the prediction block.

4. The system of claim 1, wherein the first condition includes a distance condition associated with a diagonal distance of a prediction block.

5. The system of claim 1, wherein the first condition is associated with a ratio of a width of a prediction block to a height of the prediction block, and at least one of:
- a logarithmic function of the width of the prediction block and the height of the prediction block;
- a maximum value between the width of the prediction block and the height of the prediction block; or
- a minimum value between the width of the prediction block and the height of the prediction block.

6. The system of claim 5, wherein the filter includes a set of first type of filters, a first tap count T of taps of the filter is no less than 4, each first type of filter corresponds to a set of first coefficients, a first filter count I of the set of first type of filters is no less than 8, and each set of first coefficients f[t] includes T coefficients corresponding to T reference pixels of the candidate prediction block, in which t is an integer in a range from 0 to (I−1), and wherein in response to a determination that T is an odd integer, the T reference pixels includes a current reference pixel and (T−1)/2 reference pixels on each side of the current reference pixel, $f[t] = \{a_{t,0}, \ldots, a_{t,(T-1)/2}, \ldots, a_{t,(T-1)}\}$, coefficients $a_{t,0}, a_{t,1}, \ldots, a_{t,(T-1)/2}$ decreases successively, a difference between two adjacent coefficients of $a_{t,0}, a_{t,1}, \ldots,$ $a_{t, \frac{T-1}{2}-1}$ increases successively,
coefficients $a_{t, \frac{T-1}{2}+1}, a_{t, \frac{T-1}{2}+2},$ ..., $a_{t,(T-1)}$ increases successively,
a difference between two adjacent coefficients of $a_{t,(T-1)/2+1}, a_{t,(T-1)/2+2}, \ldots, a_{t,(T-1)}$ decreases successively, and
a sum of the coefficients $a_{t,0}, \ldots, a_{t,(T-1)/2}, \ldots, a_{t,(T-1)}$ equals to $a_{0,(T-1)/2}$;

in response to a determination that T is an even integer, the T reference pixels includes a current reference pixel, (T/2−1) reference pixels in a coding direction, and T/2 reference pixels in a reverse coding direction, $f[t] = \{a_{t,0}, \ldots, a_{t,(T/2-1)}, \ldots, a_{t,(T-1)}\}$, coefficients $a_{t,0}, a_{t,1}, \ldots, a_{t,(T/2-2)}$ decreases successively, a difference between two adjacent coefficients of $a_{t,0}, a_{t,1}, \ldots, a_{t,(T/2-2)}$ increases successively, coefficients $a_{t,(T/2+1)}, a_{t,(T/2+2)}, \ldots, a_{t,(T-1)}$ increases successively, a difference between two adjacent coefficients of $a_{t,(T/2+1)}, a_{t,(T/2+2)}, \ldots, a_{t,(T-1)}$ decreases successively, and a sum of the coefficients $a_{t,0}, \ldots, a_{t,(T/2-1)}, \ldots, a_{t,(T-1)}$ equals to $a_{0,(T/2-1)}$.

7. The system of claim 5, wherein the filter includes a set of second type of filters, a second tap count T of taps of the filter is no less than 3, each second type of filter corresponds to a set of second coefficients, a second filter count I of the set of second type of filters is no less than 8, and each set of second coefficients f[t] includes T coefficients corresponding to T reference pixels of the candidate prediction block, in which t is an integer in a range from 0 to (I−1), and wherein in response to a determination that T is an odd integer, the T reference pixels includes a current reference pixel and (T−1)/2 reference pixels on each side of the current reference pixel, $f[t] = \{a_{t,0}, \ldots, a_{t,(T-1)/2}, \ldots, a_{t,(T-1)}\}$ coefficients $a_{t,0}, \ldots,$ $a_{t, \frac{T-1}{2}-1}$ increases successively,
a difference between two adjacent coefficients of $a_{t,0}, \ldots,$ $a_{t, \frac{T-1}{2}-1}$ increases successively,
coefficients $a_{t, \frac{T-1}{2}+1}, a_{t, \frac{T-1}{2}+2},$ ..., $a_{t,(T-1)}$ decreases successively,
a difference between two adjacent coefficients of $a_{t,(T-1)/2+1}, a_{t,(T-1)/2+2}, \ldots, a_{t,(T-1)}$ decreases successively, and
a sum of the coefficients $a_{t,0}, \ldots, a_{t,(T-1)/2}, \ldots, a_{t,(T-1)}$ equals to $2a_{t,(T-1)/2}$;

in response to a determination that T is an even integer, the T reference pixels includes a current reference pixel, (T/2−1) reference pixels in a coding direction, and T/2 reference pixels in a reverse coding direction, $f[t] = \{a_{t,0}, \ldots, a_{t,(T/2-1)}, \ldots, a_{t,(T-1)}\}$, coefficients $a_{t,0}, a_{t,1}, \ldots, a_{t,(T/2-2)}$ increases successively, a difference between two adjacent coefficients of $a_{t,0}$, $a_{t,1}, \ldots, a_{t,(T/2-2)}$ increases successively, coefficients $a_{t,(T/2)}, a_{t,(T/2+1)}, \ldots, a_{t,(T-1)}$ decreases successively, a difference between two adjacent coefficients of $a_{t,(T/2)}$, $a_{t,(T/2+1)}, \ldots, a_{t,(T-1)}$, decreases successively, and a sum of the coefficients $a_{t,0}, \ldots, a_{t,(T/2-1)}, \ldots, a_{t,(T-1)}$ equals to $2a_{0,T/2-1}$.

8. The system of claim 1, wherein the second condition includes a width condition associated with the width of the candidate prediction block.

9. The system of claim 8, wherein the second condition includes a position condition associated with a position or a direction that the angular prediction mode is directed to.

10. The system of claim 1, wherein the second condition includes a height condition associated with the height of the candidate prediction block.

11. The system of claim 1, wherein the second condition includes a second side length condition associated with a maximum value or a minimum value between the width of the candidate prediction block and the height of the candidate prediction block.

12. The system of claim 1, wherein the second condition includes a second aspect ratio condition associated with a ratio of the width of the candidate prediction block to the height of the candidate prediction block.

13. The system of claim 1, wherein the second condition includes at least one of:

b0:
   designating a logarithmic function of the width of the candidate prediction block as a first size parameter, and determining the filter for filtering reference pixels of the candidate prediction block along a width direction of the candidate prediction block based on the first size parameter and a predetermined rule;
   designating a logarithmic function of the height of the candidate prediction block as a second size parameter, and determining the filter for filtering reference pixels of the candidate prediction block along a height direction of the candidate prediction block based on the second size parameter and the predetermined rule;

b1:
   in response to a determination that the angular prediction mode is directed to a predetermined area, determining the filter as a first type of filter;
   in response to a determination that the angular prediction mode is not directed to the predetermined area, determining the filter for filtering reference pixels of the candidate prediction block along the width direction of the candidate prediction block based on the first size parameter and the predetermined rule, and the filter for filtering reference pixels of the candidate prediction block along the height direction of the candidate prediction block based on the second size parameter and the predetermined rule, respectively;

b2:
   designating a logarithmic function of a maximum value between the width of the candidate prediction block and the height of the candidate prediction block as a third size parameter, and determining the filter for filtering reference pixels of the candidate prediction block based on the third size parameter and the predetermined rule;

b3:
   in response to a determination that $w/d \geq r$ or $w/d \leq 1/r$, designating a logarithmic function of a minimum value between the width of the candidate prediction block and the height of the candidate prediction block as a fourth size parameter, and determining the filter for filtering reference pixels of the candidate prediction block based on the fourth size parameter and the predetermined rule;
   in response to a determination that $w/d < r$ or $w/d > 1/r$, determining the filter for filtering reference pixels of the candidate prediction block based on the third size parameter and the predetermined rule; or b4:
   designating a logarithmic function of the width of the candidate prediction block and the height of the candidate prediction block as a fifth size parameter, and determining the filter for filtering reference pixels of the candidate prediction block based on the fifth size parameter and the predetermined rule.

14. The system of claim 13, wherein the predetermined rule includes:
   in response to a determination that a size parameter of the first size parameter, the second size parameter, the third size parameter, the fourth size parameter, and the fifth size parameter is in a first range, determining the filter as the first type of filter;
   in response to a determination that a size parameter of the first size parameter, the second size parameter, the third size parameter, the fourth size parameter, and the fifth size parameter is beyond the first range, and the angular prediction mode is in a second predetermined filtering range, determining the filter as a second type of filter; and
   in response to a determination that a size parameter of the first size parameter, the second size parameter, the third size parameter, the fourth size parameter, and the fifth size parameter is beyond the first range and the angular prediction mode is beyond the second predetermined filtering range, determining the filter as the first type of filter.

15. The system of claim 13, wherein the predetermined area includes at least one of a first vertical diagonal area, a first horizontal diagonal area, a second vertical diagonal area, a second horizontal diagonal area, a near-vertical area, or a near-horizontal area.

16. The system of claim 1, wherein the determining the filter includes:
   determining a tap count of taps of the filter; and
   determining coefficients of the filter based on the tap count.

17. The system of claim 1, wherein the at least one processor is directed to perform additional operations including:
   obtaining reference pixels of the candidate prediction block based on the angular prediction mode;
   filtering the reference pixels using the filter; and
   determining, based on the filtered reference pixels, a predicted pixel value of each candidate pixel in the candidate prediction block.

18. A method for intra prediction, comprising:
   selecting a candidate prediction block from a plurality of prediction blocks of a video slice according to a first condition, wherein a width of the candidate prediction block is different from a height of the candidate prediction block;

selecting an angular prediction mode from a plurality of candidate prediction modes of the candidate prediction block; and determining a filter for the angular prediction mode of the candidate prediction block according to a second condition, wherein the second condition is associated with the width of the candidate prediction block or the height of the candidate prediction block, and the first condition includes at least one of:
- a0: unconditional;
- a1: m1≥log 2size≥m0, and n1≥w/d≥n0 or 1/n1≤w/d≤1/n0;
- a2: m1≥log 2size≥m0, and w/d satisfies one of w/d≥n1, w/d≤n0, w/d≤1/n1, or w/d≥1/n0;
- a3: n1≥w/d≥n0 or 1/n1≤w/d≤1/n0, and log 2size satisfies one of log 2size≥m1, or log 2size≤m0;
- a4: log 2size satisfies one of log 2size≥m1, or log 2size≤m0, and w/d satisfies one of w/d≥n1, w/d≤n0, w/d≤1/n1, or w/d≥1/n0;
- a5: L1≥length0≥L0, and n1≥w/d≥n0 or 1/n1≤w/d≤1/n0;
- a6: L1≥length0≥L0, and w/d satisfies one of w/d≥n1, w/d≤n0, w/d≤1/n1, or w/d≥1/n0;
- a7: n1≥w/d≥n0 or 1/n1≤w/d≤1/n0, and length0 satisfies one of length0≥L1, or length0≤L0;
- a8: length0 satisfies one of length0≥L1, or length0≤L0, and w/d satisfies one of w/d≥n1, w/d≤n0, w/d≤1/n1, or w/d≥1/n0;
- a9: L1≥length1≥L0, and n1≥w/d≥n0 or 1/n1≤w/d≤1/n0;
- a10: L1≥length1≥L0, and w/d satisfies one of w/d≥n1, w/d≤n0, w/d≤1/n1, or w/d≥1/n0;
- a11: n1≥w/d≥n0 or 1/n1≤w/d≤1/n0, and length1 satisfies one of length1≥L1, or length1≤L0; or
- a12: length1 satisfies one of length1≥L1, or length1≤L0, and w/d satisfies one of w/d≥n1, w/d≤n0, w/d≤1/n1, or w/d≥1/n0;

wherein log 2size is the logarithmic function of the width of the prediction block and the height of the prediction block, w/d is the ratio of the width of the prediction block to the height of the prediction block, length0 is the maximum value between the width of the prediction block and the height of the prediction block, length1 is the minimum value between the width of the prediction block and the height of the prediction block, and L0, L1, m1, m0, n1, and n0 are predetermined values.

19. A system for intra prediction, comprising:

at least one storage medium including a set of instructions for intra prediction; and at least one processor in communication with the storage medium, wherein when executing the set of instructions, the at least one processor is directed to perform operations including:

obtaining a candidate prediction block to be predicted according to a first condition, wherein a width of the candidate prediction block is different from a height of the candidate prediction block;

determining reference pixels of the candidate prediction block;

determining, based on a size of the candidate prediction block and a current prediction mode, a filter for filtering the reference pixels of the candidate prediction block; and determining, in the current prediction mode, a predicted pixel value of each candidate pixel in the candidate prediction block, based on the reference pixels and the filter, wherein the first condition includes at least one of:
- a0: unconditional;
- a1: m1≥log 2size≥m0, and n1≥w/d≥n0 or 1/n1≤w/d≤1/n0;
- a2: m1≥log 2size≥m0, and w/d satisfies one of w/d≥n1, w/d≤n0, w/d≤1/n1, or w/d≥1/n0;
- a3: n1≥w/d≥n0 or 1/n1≤w/d≤1/n0, and log 2size satisfies one of log 2size≥m1, or log 2size≤m0;
- a4: log 2size satisfies one of log 2size≥m1, or log 2size≤m0, and w/d satisfies one of w/d≥n1, w/d≤n0, w/d≤1/n1, or w/d≥1/n0;
- a5: L1≥length0≥L0, and n1≥w/d≥n0 or 1/n1≤w/d≤1/n0;
- a6: L1≥length0≥L0, and w/d satisfies one of w/d≥n1, w/d≤n0, w/d≤1/n1, or w/d≥1/n0;
- a7: n1≥w/d≥n0 or 1/n1≤w/d≤1/n0, and length0 satisfies one of length0≥L1, or length0≤L0;
- a8: length0 satisfies one of length0≥L1, or length0≤L0, and w/d satisfies one of w/d≥n1, w/d≤n0, w/d≤1/n1, or w/d≥1/n0;
- a9: L1≥length1≥L0, and n1≥w/d≥n0 or 1/n1≤w/d≤1/n0;
- a10: L1≥length1≥L0, and w/d satisfies one of w/d≥n1, w/d≤n0, w/d≤1/n1, or w/d≥1/n0;
- a11: n1≥w/d≥n0 or 1/n1≤w/d≤1/n0, and length1 satisfies one of length1≥L1, or length1≤L0; or
- a12: length1 satisfies one of length1≥L1, or length1≤L0, and w/d satisfies one of w/d≥n1, w/d≤n0, w/d≤1/n1, or w/d≥1/n0;

wherein log 2size is the logarithmic function of the width of the prediction block and the height of the prediction block, w/d is the ratio of the width of the prediction block to the height of the prediction block, length0 is the maximum value between the width of the prediction block and the height of the prediction block, length1 is the minimum value between the width of the prediction block and the height of the prediction block, and L0, L1, m1, m0, n1, and n0 are predetermined values.

\* \* \* \* \*